US008685485B2

(12) United States Patent
McMindes et al.

(10) Patent No.: US 8,685,485 B2
(45) Date of Patent: Apr. 1, 2014

(54) PROTEIN COMPOSITION AND ITS USE IN RESTRUCTURED MEAT AND FOOD PRODUCTS

(75) Inventors: Matthew K. McMindes, Chesterfield, MO (US); Izumi Mueller, Glen Carbon, IL (US); Mac W. Orcutt, St. Louis, MO (US); Patricia A. Altemueller, Webster Groves, MO (US); Eduardo Godinez, Chesterfield, MO (US)

(73) Assignee: Solae, LLC, St. Louis, MO (US)

(*) Notice: Subject to any disclaimer, the term of this patent is extended or adjusted under 35 U.S.C. 154(b) by 1073 days.

(21) Appl. No.: 11/437,164

(22) Filed: May 19, 2006

(65) Prior Publication Data

US 2007/0269583 A1    Nov. 22, 2007

(51) Int. Cl.
*A23J 1/00* (2006.01)

(52) U.S. Cl.
USPC ........... 426/656; 426/634; 426/241; 426/104; 426/274; 426/802

(58) Field of Classification Search
USPC .................. 426/634, 241, 104, 274, 802, 656
See application file for complete search history.

(56) References Cited

U.S. PATENT DOCUMENTS

| | | | |
|---|---|---|---|
| 2,682,466 A | 6/1954 | Boyer | |
| 3,102,031 A | 8/1963 | MacAllister | |
| 3,117,006 A | 1/1964 | Wenger et al. | |
| 3,488,770 A | 1/1970 | Atkinson | |
| 3,662,671 A | 5/1972 | Frederiksen et al. | |
| 3,662,672 A | 5/1972 | Hoer | |
| 3,793,466 A | 2/1974 | Hawkins et al. | |
| 3,814,823 A | 6/1974 | Yang et al. | |
| 3,870,805 A | 3/1975 | Hayes et al. | |
| 3,881,024 A | 4/1975 | Pahoundis | |
| 3,883,672 A | 5/1975 | Bone et al. | |
| 3,886,299 A | 5/1975 | Feldbrugge et al. | |
| 3,897,572 A | 7/1975 | Riggs et al. | |
| 3,900,576 A * | 8/1975 | Schulz | 426/311 |
| 3,903,315 A | 9/1975 | Giles | |
| 3,925,561 A | 12/1975 | Herstel et al. | |
| 3,928,652 A | 12/1975 | Lanter | |
| 3,930,033 A * | 12/1975 | Corliss et al. | 426/103 |
| 3,934,050 A | 1/1976 | Hawkins | |
| 3,940,500 A | 2/1976 | Sortwell, III | |
| 4,032,666 A | 6/1977 | Obata et al. | |
| 4,052,517 A * | 10/1977 | Youngquist | 426/302 |
| 4,061,789 A | 12/1977 | Warren et al. | |
| 4,084,017 A | 4/1978 | Kim et al. | |
| 4,118,164 A | 10/1978 | Wenger et al. | |
| 4,125,630 A * | 11/1978 | Orthoefer | 426/104 |
| 4,125,635 A | 11/1978 | de Ruyter | |
| 4,132,809 A | 1/1979 | Desrosier | |
| 4,145,447 A | 3/1979 | Fisher et al. | |
| 4,197,323 A | 4/1980 | Cerise et al. | |
| 4,216,240 A | 8/1980 | Shirai et al. | |
| 4,219,576 A | 8/1980 | Kawasaki | |
| 4,287,219 A | 9/1981 | Fabre | |
| 4,288,397 A | 9/1981 | Snowden | |
| 4,303,682 A | 12/1981 | Guitten et al. | |
| 4,332,823 A | 6/1982 | Buemi | |
| 4,338,340 A | 7/1982 | Morimoto et al. | |
| 4,361,588 A | 11/1982 | Herz | |
| 4,369,195 A | 1/1983 | Nelson et al. | |
| 4,376,134 A | 3/1983 | Kumar et al. | |
| 4,391,840 A | 7/1983 | Ederle | |
| 4,439,456 A | 3/1984 | Kammuri et al. | |
| 4,490,397 A | 12/1984 | Maurice et al. | |
| 4,495,205 A * | 1/1985 | Brander et al. | 426/104 |
| 4,517,218 A | 5/1985 | Yackel, Jr. et al. | |
| 4,562,082 A | 12/1985 | Morimoto | |

(Continued)

FOREIGN PATENT DOCUMENTS

| | | |
|---|---|---|
| CH | 687116 | 9/1996 |
| CH | 687116 A5 | 9/1996 |

(Continued)

OTHER PUBLICATIONS

Pedersen, HE et al., "Meat and Vegetarian Applications of Soy Protein Concentrates", food Tech Europe, vol. 1, No. 5, 1994, p. 90, 92, 94, XP00958004.
Beery, KE et al., Preparation of Soy Protein Concentrate Products and Their Application in Food Systems. American Oil Chemists Society 1991, 23, 8G9.
Lecomte NB et al., "Soya Proteins Functional and Sensory Characteristics Improved in Comminuted Meats" Journal of Food Science, vol. 58 (1993) No. 3 pp. 464-466 and 472.
Database WPI Week 198701, Thomson Scientific, London, GB; AN 1987-002391, XP002497680 & JP61260839 A, Nov. 19, 1986 Abstract.
Association of American Feed Control Officials, Incorporated, "Feed Ingredient Definitions" 2008 p. 259.
Yacu, Waleed, Presentation "Thermoplastic and Food Extrusion General Introduction", pp. 11-12 & 34, Jun. 25-27, 1990, East Brunswick, NJ.

(Continued)

*Primary Examiner* — Anthony Weier

(57) ABSTRACT

This invention relates to a protein containing composition, comprising; a protein composition, wherein at least about 75 weight % of the protein composition contains at least about 15 weight % of large pieces including protein fibers at least about 4 centimeters long, protein strands at least about 3 centimeters long, and protein chunks at least about 2 centimeters long and wherein at least about 75 weight % of the protein composition has a shear strength of at least about 1400 grams. The invention also relates to a process for preparing the protein composition. The invention further relates to a restructured meat product, or a vegetable product, or a fruit product having; a vegetable protein composition; a comminuted meat, or a comminuted vegetable, or a comminuted fruit, respectively; and water; wherein at least about 75 weight % of the protein composition contains at least about 15 weight % of large pieces including protein fibers at least about 4 centimeters long, protein strands at least about 3 centimeters long, and protein chunks at least about 2 centimeters long and wherein at least about 75 weight % of the protein composition has a shear strength of at least about 1400 grams. In another embodiment, the invention has a process for preparing the restructured meat product, or the vegetable product, or the fruit product, respectively.

38 Claims, No Drawings

(56) References Cited

U.S. PATENT DOCUMENTS

| | | | |
|---|---|---|---|
| 4,579,741 A | 4/1986 | Hanson et al. | |
| 4,590,079 A | 5/1986 | Nishimori et al. | |
| 4,752,196 A | 6/1988 | Wolfe, Jr. | |
| 4,763,569 A | 8/1988 | Wenger et al. | |
| 4,818,558 A | 4/1989 | Hartman et al. | |
| 4,863,749 A * | 9/1989 | Yamada | 426/241 |
| 4,868,002 A | 9/1989 | Scaglione et al. | |
| 4,880,654 A | 11/1989 | Okada | |
| 4,897,280 A | 1/1990 | Ohtsu | |
| 4,910,040 A * | 3/1990 | Sagarino et al. | 426/656 |
| 4,975,294 A | 12/1990 | Cohen | |
| 4,995,800 A | 2/1991 | Lupke | |
| 5,039,543 A | 8/1991 | Lee et al. | |
| 5,300,312 A | 4/1994 | Lusas et al. | |
| 5,333,538 A | 8/1994 | Sawa | |
| 5,437,885 A | 8/1995 | Lusas et al. | |
| 5,731,029 A | 3/1998 | Karwowski et al. | |
| 5,804,246 A | 9/1998 | Peck et al. | |
| 5,922,392 A | 7/1999 | Kelly et al. | |
| 5,945,152 A | 8/1999 | Purser et al. | |
| 6,319,539 B1 | 11/2001 | Shemer et al. | |
| 6,358,547 B1 | 3/2002 | DuPont | |
| 6,379,738 B1 | 4/2002 | Dingman et al. | |
| 6,613,369 B2 | 9/2003 | Gaebler et al. | |
| 6,635,301 B1 * | 10/2003 | Howsam | 426/574 |
| 2002/0142086 A1 | 10/2002 | Gaebler et al. | |
| 2002/0160097 A1 | 10/2002 | Altemueller et al. | |
| 2004/0206246 A1 | 10/2004 | Bortone et al. | |
| 2005/0112271 A1 | 5/2005 | Pickarski | |
| 2006/0035003 A1 | 2/2006 | McMindes et al. | |
| 2006/0035005 A1 | 2/2006 | McMindes et al. | |
| 2006/0035006 A1* | 2/2006 | McMindes et al. | 426/646 |
| 2006/0051492 A1 | 3/2006 | Mueller et al. | |
| 2006/0073261 A1 | 4/2006 | McMindes et al. | |
| 2007/0148323 A1 | 6/2007 | Dingman et al. | |
| 2007/0269567 A1 | 11/2007 | McMindes et al. | |
| 2007/0269583 A1 | 11/2007 | McMindes et al. | |
| 2008/0069926 A1 | 3/2008 | Mueller et al. | |
| 2008/0069927 A1 | 3/2008 | Altemueller et al. | |
| 2008/0075808 A1 | 3/2008 | Altemueller et al. | |
| 2008/0118607 A1 | 5/2008 | Arno et al. | |
| 2008/0166443 A1 | 7/2008 | Busse et al. | |
| 2008/0233244 A1 | 9/2008 | Swenson | |
| 2008/0248167 A1 | 10/2008 | McMindes et al. | |
| 2008/0254167 A1 | 10/2008 | McMindes et al. | |
| 2008/0254168 A1 | 10/2008 | Mueller et al. | |
| 2008/0254199 A1 | 10/2008 | Orcutt et al. | |
| 2008/0260913 A1 | 10/2008 | Orcutt et al. | |
| 2008/0268112 A1 | 10/2008 | Rolan et al. | |
| 2009/0123629 A1 | 5/2009 | Chang et al. | |
| 2009/0208633 A1 | 8/2009 | Kyed et al. | |
| 2010/0166940 A1 | 7/2010 | McMindes et al. | |

FOREIGN PATENT DOCUMENTS

| | | |
|---|---|---|
| DE | 139385 | 1/1980 |
| EP | 0010798 | 5/1980 |
| EP | 0048533 | 3/1982 |
| EP | 048533 | 3/1982 |
| EP | 0385266 | 9/1990 |
| EP | 1180332 | 2/2002 |
| FR | 2218842 | 9/1974 |
| GB | 1082420 | 9/1967 |
| GB | 1173976 | 12/1969 |
| GB | 1448875 | 9/1976 |
| GB | 1464376 | 2/1977 |
| GB | 1524712 | 9/1978 |
| GB | 1548971 | 7/1979 |
| GB | 1552091 | 9/1979 |
| IE | S930970 | 12/1993 |
| JP | 53-122825 | 10/1978 |
| JP | 0048533 | 3/1982 |
| JP | 58155060 | 9/1983 |
| JP | 61012254 | 1/1986 |
| JP | 61260839 | 11/1986 |
| JP | 63068060 | 3/1988 |
| JP | 63-240749 | 10/1988 |
| JP | 64-020059 | 1/1989 |
| JP | 01043159 | 2/1989 |
| JP | 04293455 | 10/1992 |
| JP | 06-098685 | 4/1994 |
| JP | 08066157 | 3/1996 |
| JP | 10-014499 | 1/1998 |
| JP | 2007-279099 | 10/2000 |
| JP | 2001-327253 | 11/2001 |
| JP | 2002000237 | 1/2002 |
| JP | 2003259840 | 9/2003 |
| MX | PA05004544 | 7/2006 |
| WO | WO8806001 | 8/1988 |
| WO | 00069276 | 11/2000 |
| WO | 03070007 | 8/2003 |
| WO | 2004016097 | 2/2004 |
| WO | WO2004016097 | 2/2004 |
| WO | 2004045301 | 6/2004 |
| WO | 2005092115 | 10/2005 |
| WO | 2005096834 | 10/2005 |
| WO | 2006023518 | 3/2006 |
| WO | WO2006023518 | 3/2006 |
| WO | 2006041966 | 4/2006 |
| WO | 2007038125 | 4/2007 |
| WO | 2007137122 | 11/2007 |
| WO | 2007137125 | 11/2007 |
| WO | WO2007137122 | 11/2007 |
| WO | 2008036906 | 3/2008 |
| WO | WO2008034063 | 3/2008 |
| WO | 2008043076 | 4/2008 |
| WO | WO2008043076 | 4/2008 |
| WO | 2008064224 | 5/2008 |

OTHER PUBLICATIONS

Hauck, B. W., "Process Variables and their Control for the Production of Expanded Products by Extrusion Cooking", pp. 29-30, Jan. 30, 1981, Sabetha, KS.

Kearns, Joseph P. et al, Presented at the World Congress "Extrusion of Texturized Proteins", pp. 25, 31, 36-37, Oct. 2-7, 1988, Singapore.

Rokey, Galen J. et al., Presentation "Extrusion Cooked and Textured Defatted Soybean Flours and Protein Concentrates", p. 12, Sep. 1992, Budapest, Hungary.

Wenger Manufactured, Inc., "Textured Vegetable Proteins", pp. 12-13, 2000, Sabetha, KS.

Konwinski, Arthur H., "Soy Protein Concentrate Processing and Characteristics", Jul. 1, 1991, Orange Beach, AL.

Konwinski, Arthur H., Presentation "Applications of Soy in Meats", Jun. 18-20, 2001, Urbana, IL.

Cheftel, J.C. et al., "New Protein Texturization Processes by Extrusion Cooking at High Moisture Levels", Food Reviews International, 8(2), 235-275 (1992).

Clextral Group, "Protein Fibration", Marketing Material.

Greentex®, "High Quality Textured Soy Protein", Marketing Material.

Vetex®, "Live Your Life to the Fullest", Marketing Material.

Hernandez, Ernesto. "Infusing foods with fish oil", May 1, 2004.

Office Action from United States Patent and Trademark Office for U.S. Appl. No. 11/852,637; Jun. 24, 2009.

Office Action from United States Patent and Trademark Office for U.S. Appl. No. 11/852,637; Aug. 3, 2010.

Communication from European Patent Office Examining Division for EP Patent Application No. 07842508.9; Sep. 16, 2009.

Office Action from United States Patent and Trademark Office for U.S. Appl. No. 11/963,375; Apr. 1, 2010.

Office Action from United States Patent and Trademark Office for U.S. Appl. No. 11/942,860; Jun. 25, 2009.

Office Action from United States Patent and Trademark Office for U.S. Appl. No. 11/942,860; Apr. 2, 2010.

Office Action from United States Patent and Trademark Office for U.S. Appl. No. 11/942,860; Aug. 3, 2010.

Office Action from United States Patent and Trademark Office for U.S. Appl. No. 12/062,366; Apr. 2, 2010.

Office Action from United States Patent and Trademark Office for U.S. Appl. No. 12/062,366; Sep. 3, 2010.

(56) References Cited

OTHER PUBLICATIONS

Office Action from United States Patent and Trademark Office for U.S. Appl. No. 12/059,961; Jun. 4, 2010.
Communication from European Patent Office Examining Division for EP Patent Application No. 08799773.0; Jan. 20, 2010.
Communication from European Patent Office Examining Division for EP Patent Application No. 08799773.0; Apr. 21, 2010.
Office Action from United States Patent and Trademark Office for U.S. Appl. No. 11/244,941; Apr. 21, 2010.
Office Action from United States Patent and Trademark Office for U.S. Appl. No. 10/919,421; Jan. 8, 2009.
Communication from European Patent Office Examining Division for EP Patent Application No. 05808397.3; May 20, 2008.
Communication from European Patent Office Examining Division for EP Patent Application No. 05808397.3; Dec. 11, 2008.
Office Action from United States Patent and Trademark Office for U.S. Appl. No. 11/437,164; Oct. 8, 2009.
Communication from European Patent Office Examining Division for EP Patent Application No. 07783880.3; Apr. 21, 2009.
Communication from European Patent Office Examining Division for EP Patent Application No. 07762236.3; Apr. 22, 2009.
Office Action from United States Patent and Trademark Office for U.S. Appl. No. 10/959,277; Jan. 9, 2008.
Office Action from United States Patent and Trademark Office for U.S. Appl. No. 10/959,277; Jul. 2, 2008.
Office Action from United States Patent and Trademark Office for U.S. Appl. No. 10/919,421; Jul. 21, 2009.
Office Action from United States Patent and Trademark Office for U.S. Appl. No. 10/919,421; Mar. 26, 2010.
Office Action from United States Patent and Trademark Office for U.S. Appl. No. 10/919,421; Jul. 7, 2010.
Office Action from United States Patent and Trademark Office for U.S. Appl. No. 11/204,454; Jun. 23, 2008.
Office Action from United States Patent and Trademark Office for U.S. Appl. No. 11/204,454; Jan. 7, 2009.
Office Action from United States Patent and Trademark Office for U.S. Appl. No. 11/204,454; Apr. 2, 2010.
Exam Report from Australian Patent Office for AU Application No. 20052774825; Apr. 27, 2010.
Communication from European Patent Office Examining Division for EP Patent Application No. 05785241.0; Mar. 18, 2008.
Office Action from United States Patent and Trademark Office for U.S. Appl. No. 11/244,941; Jun. 24, 2008.
Communication from European Patent Office Examining Division for EP Patent Application No. 08799773.0; Aug. 5, 2010.
Communication from European Patent Office Examining Division for EP Patent Application No. 07842902.4; Sep. 9, 2009.
Office Action from United States Patent and Trademark Office for U.S. Appl. No. 10/959,277; Nov. 21, 2008.
Communication from European Patent Office Examining Division for EP Patent Application No. 07842971.9; Jul. 31, 2009.
Office Action from United States Patent and Trademark Office for U.S. Appl. No. 10/959,277; Aug. 28, 2008.
Office Action from United States Patent and Trademark Office for U.S. Appl. No. 11/857,876; Aug. 6, 2010.
Office Action from United States Patent and Trademark Office for U.S. Appl. No. 10/959,277; Jun. 29, 2009.
Office Action from United States Patent and Trademark Office for U.S. Appl. No. 10/959,277; Aug. 6, 2010.
Office Action from United States Patent and Trademark Office for U.S. Appl. No. 10/919,421; Jun. 23, 2008.
Office Action from United States Patent and Trademark Office for U.S. Appl. No. 11/244,941; Nov. 25, 2008.
Office Action from United States Patent and Trademark Office for U.S. Appl. No. 10/959,277; Sep. 28, 2009.
Office Action from United States Patent and Trademark Office for U.S. Appl. No. 10/959,277; Jan. 25, 2010.
Office Action from United States Patent and Trademark Office for U.S. Appl. No. 11/244,941; Aug. 31, 2010.
Office Action from United States Patent and Trademark Office for U.S. Appl. No. 11/244,941; Jan. 24, 2008.
Notice of Allowance from United States Patent and Trademark Office for U.S. Appl. No. 11/437,164; Oct. 8, 2010.
Notice of Allowance from United States Patent and Trademark Office for U.S. Appl. No. 12/059,961; Mar. 31, 2008.
Notice of Allowance from United States Patent and Trademark Office for U.S. Appl. No. 10/919,421; Aug. 16, 2004.
Office Action from United States Patent and Trademark Office for U.S. Appl. No. 10/959,277; Apr. 12, 2011.
Office Action from United States Patent and Trademark Office for U.S. Appl. No. 11/749,590; Mar. 23, 2011.
Office Action from United States Patent and Trademark Office for U.S. Appl. No. 11/963,375; Dec. 9, 2010.
Office Action from United States Patent and Trademark Office for U.S. Appl. No. 11/964,538; Apr. 4, 2011.
Office Action from United States Patent and Trademark Office for U.S. Appl. No. 12/059,432; Oct. 29, 2010.
Office Action from United States Patent and Trademark Office for U.S. Appl. No. 12/057,834; Oct. 27, 2010.
Office Action from United States Patent and Trademark Office for U.S. Appl. No. 12/061,843; Oct. 29, 2010.
Office Action from United States Patent and Trademark Office for U.S. Appl. No. 12/184,983; Apr. 15, 2011.
Office Action from United States Patent and Trademark Office for U.S. Appl. No. 11/858,769; Nov. 10, 2010.
Communication from European Patent Office Examining Division for EP Patent Application No. 08745094.6, Dec. 15, 2010.
Communication from European Patent Office Examining Division for EP Patent Application No. 08744781.9, Feb. 22, 2011.
Communication from European Patent Office Examining Division for EP Patent Application No. 08745155.5, Dec. 15, 2010.
Communication from European Patent Office Examining Division for EP Patent Application No. 09712796.3, Feb. 3, 2011.
International Preliminary Report on Patentability for International Application No. PCT/US2005/029182, Feb. 20, 2007.
International Preliminary Report on Patentability for International Application No. PCT/US2005/035904, Apr. 20, 2006.
International Preliminary Report on Patentability for International Application No. PCT/US2007/080601, Apr. 7, 2009.
International Preliminary Report on Patentability for International Application No. PCT/US2007/088696, Jun. 30, 2009.
International Preliminary Report on Patentability for International Application No. PCT/US2008/059373, Oct. 13, 2009.
International Preliminary Report on Patentability for International Application No. PCT/US2008/058905, Oct. 6, 2009.
International Preliminary Report on Patentability for International Application No. PCT/US2008/059450, Oct. 6, 2009.
International Preliminary Report on Patentability for International Application No. PCT/US2008/059466, Oct. 6, 2009.
International Preliminary Report on Patentability for International Application No. PCT/US2008/072022, Feb. 2, 2010.
International Preliminary Report on Patentability for International Application No. PCT/US2009/034693, Aug. 24, 2010.
International Preliminary Report on Patentability for International Application No. PCT/US2008/059385, Oct. 13, 2009.
European Search Report European Patent Application No. 10177208.5, Nov. 24, 2010.
Office Action from Chinese Patent and Trademark Office for CN Patent Application No. 200580035176, Nov. 27, 2009.
Office Action from Chinese Patent and Trademark Office for CN Patent Application No. 200580035176, Aug. 11, 2010.
Biqing Li, Textured Soy Protein Applied in Pork Meatball, Meat Research No. 4 pp. 26 & 33-35, 2001.
Office Action from Japanese Patent and Trademark Office for JP Patent Application No. 2007-527959, Aug. 10, 20010.
Communication from European Patent Office Examining Division for EP Patent Application No. 07842971.9, Jul. 31, 2009.
Opposition filed in the European Patent Office against European Patent No. 2020868; Sep. 6, 2011.
Office Action from United States Patent and Trademark Office for U.S. Appl. No. 11/858,769; Aug. 30, 2011.

(56) References Cited

OTHER PUBLICATIONS

Office Action from Chinese Patent and Trademark Office for CN Patent Application No. CN200780027323.8, Aug. 31, 2011.
Office Action from Chinese Patent and Trademark Office for CN Patent Application No. CN200780034138.1, Aug. 24, 2011.
Office Action from Chinese Patent and Trademark Office for CN Patent Application No. CN20070037387.6, Aug. 8, 2011.
Office Action from United States Patent and Trademark Office for U.S. Appl. No. 12/444,111, Oct. 27, 2011.
Office Action from United States Patent and Trademark for U.S. Appl. No. 11/963,375, Aug. 4, 2011.
Office Action from United States Patent and Trademark for U.S. Appl. No. 12/389,148, Aug. 19, 2011.
Office Action from Japanese Patent and Trademark Office for JP Patent Application No. 2007-527959, Sep. 15, 2010.
Beerky, K.E., Preparation of Soy Protein Concentrate Products and Their Application in Food Systems, The Proceedings of the World Congress on Vegetable Protein in Utilization in Human Foods and Animal Foodstuffs Conference, Oct. 1988, pp. 62-65, American Oil Chemist' Society, Champaign, IL, USA.
Office Action from United States Patent and Trademark Office for U.S. Appl. No. 11/749,590; Mar. 13, 2012.
Office Action from United States Patent and Trademark Office for U.S. Appl. No. 12/062,366; Dec. 8, 2011.
European Search Report for EP Application No. 11164506.5 dated Sep. 28, 2011.
Japanese Patent Application No. 2009-512226 Office Action dated Apr. 16, 2012.
Japanese Patent Application No. 2009-512227 Office Action dated Apr. 16, 2012.
Chinese Patent Application No. 200780027433.4 Office Action dated Jun. 25, 2012.
Office Action from United States Patent and Trademark Office for U.S. Appl. No. 12/444,111, May 24, 2013.
Office Action from Chinese Patent and Trademark Office for China Patent Application No. 201080048380.6, Apr. 1, 2013.
Office Action from Canadian Patent and Trademark Office for Canada Patent Application No. 2652380, Jun. 14, 2013.

* cited by examiner

PROTEIN COMPOSITION AND ITS USE IN RESTRUCTURED MEAT AND FOOD PRODUCTS

FIELD OF THE INVENTION

This invention relates to a hydrated and shredded protein composition and to the use of the hydrated and shredded protein composition in vegetable products, fruit products, and in restructured meat products. This invention also relates to a process for preparing the hydrated and shredded protein composition. Further, this invention relates to a restructured meat product containing the hydrated and shredded protein composition and the process for making the same by the combination of a hydrated and shredded protein composition, comminuted meat and water, such that a meat product is obtained having a texture similar to that of intact muscles. Also, this invention relates to a vegetable product containing the hydrated and shredded protein composition and to its process by the combination of a hydrated and shredded protein composition, comminuted vegetable and water, such that a vegetable product is obtained. Further, this invention relates to a fruit product containing the hydrated and shredded protein composition and to its process by the combination of a hydrated and shredded protein composition, comminuted fruit and water, such that a fruit product is obtained. The hydrated and shredded protein composition may further contain starches, flour and fibers.

BACKGROUND OF THE INVENTION

An important aspect of the present invention is the development of an unstructured protein product into a structured protein product. Particularly, in one embodiment, the present invention provides a product and method for taking an unstructurized protein product with no visible grain or texture and converting it into a structurized, protein product with a definite shape having the consistency of cooked muscle meat.

The term "structure" describes a wide variety of physical properties of a food product. A product of acceptable structure is usually synonymous with the quality of a product. Structure has been defined as "the attribute of a substance resulting from a combination of physical properties and perceived by senses of touch, including kinethesia and mouth feel, sight, and hearing. Structure, as defined by the International Organization of Standardization, is "all of the rheological and structural (geometric and surface) attributes of a food product perceptible by means of mechanical, tactual and, where appropriate, visual and auditory receptors." The following terms have been used to describe product characteristics falling under the umbrella "structure":

TABLE I

| ABRIDGED LIST OF FOOD STRUCTURE ADJECTIVES |
|---|
| Adhesive |
| Bouncy |
| Brittle |
| Bubbly |
| Chewy |
| Clingy |
| Coating |
| Cohesive |
| Creamy |
| Crisp |
| Crumbly |
| Crusty |
| Dense |
| Doughy |
| Dry |
| Elastic |
| Fatty |
| Firm |
| Flaky |
| Fleshy |
| Fluffy |
| Foamy |
| Fragile |
| Full-bodied |
| Gooey |
| Grainy |
| Gritty |
| Gummy |
| Hard |
| Heavy |
| Heterogeneous |
| Juicy |
| Lean |
| Light |
| Limp |
| Lumpy |
| Moist |
| Mouth coating |
| Mushy |
| Oily |
| Pasty |
| Plastic |
| Porous |
| Powdery |
| Puffy |
| Pulpy |
| Rich |
| Rough |
| Rubbery |
| Runny |
| Sandy |
| Scratchy |
| Short |
| Silky |
| Slippery |
| Slivery |
| Smooth |
| Soft |
| Soggy |
| Sparkly |
| Splintery |
| Spongy |
| Springy |
| Sticky |
| Stringy |
| Syrupy |
| Tender |
| Thick |
| Thin |
| Tingly |
| Tough |
| Uniform |
| Viscous |
| Watery |
| Waxy |
| Wiggly |

Accelerated attention has been given to structure as it pertains to newer food substances including fabricated and imitation products, formed meat and fish products, where very serious efforts are made by processes to duplicate the properties of the original or other natural food substances. The use of non-traditional raw materials, synthetic flavors, fillers, and stretchers all tend to alter certain textural characteristics of the finished product. Frequently, the imitation of textural properties is of much greater difficulty in the replication of taste, odors, and colors. Numerous manipulative processes, including extrusion structurization, have been developed to simulate natural structural properties. The processes generally find it prudent to duplicate the properties of the original substances to the extent feasible technically and economically in order to promote early market acceptance. While structure has attributes related to appearance, it also has attributes related to touch and also mouth feel or interaction of food when it comes in contact with the mouth. Frequently, these sensory perceptions involved with chewing can relate to impressions of either desirability or undesirability.

Thus, structural terms include terms relating to the behavior of the material under stress or strain and include, for example, the following: firm, hard, soft, tough, tender, chewy, rubbery, elastic, plastic, sticky, adhesive, tacky, crispy, crunchy, etc. Secondly, structure terms may be related to the structure of the material: smooth, fine, powdery, chalky, lumpy, mealy, coarse, gritty, etc. Third, structure terms may relate to the shape and arrangement of structural elements, such as: flaky, fibrous, stringy, pulpy, cellular, crystalline, glassy, spongy, etc. Last, structure terms may relate to mouth feel characteristics, including: mouth feel, body, dry, moist, wet, watery, waxy, slimy, mushy, etc.

As used herein, "unstructurized" and "structurized" describe the characteristics of the food product as set forth in Table II:

TABLE II

| | Unstructurized Characteristic | Structurized Characteristic |
|---|---|---|
| Behavior of Material under Stress or Strain | sticky gooey plastic | firm chewy |
| Structure of Material | smooth | coarse |
| Shape and Arrangement of Structural Elements | gelatinous pulpy pasty | fibrous crusty |
| Mouth Feel | creamy mushy with body | moist dry |

SUMMARY OF THE INVENTION

This invention relates to a hydrated and shredded protein composition wherein at least about 75 weight % of the hydrated and shredded protein composition contains at least about 15 weight % of large pieces comprised of protein fibers at least about 4 centimeters long, protein strands at least about 3 centimeters long, and protein chunks at least about 2 centimeters long and wherein at least about 75 weight % of the hydrated and shredded protein composition has a shear strength of at least about 1400 grams.

The invention also relates to a process for preparing the hydrated and shredded protein composition.

The invention further relates to a meat or food product, comprising;
a hydrated and shredded protein composition;
a comminuted meat, or a comminuted vegetable, or a comminuted fruit, respectively; and
water;
wherein at least about 75 weight % of the hydrated and shredded protein composition contains at least about 15 weight % of large pieces comprised of protein fibers at least about 4 centimeters long, protein strands at least about 3 centimeters long, and protein chunks at least about 2 centimeters long and wherein at least about 75 weight % of the hydrated and shredded protein composition has a shear strength of at least about 1400 grams.

In another embodiment, the invention discloses a process for preparing the meat or food product.

DETAILED DESCRIPTION OF THE INVENTION

Mechanically deboned meat (MDM) is a meat paste that is recovered from beef, pork and chicken bones using commercially available equipment. MDM is a comminuted product that is devoid of the natural fibrous texture found in intact muscles. The lack of fibrosity constrains the utility of MDM and most often limits its use to the manufacture of comminuted sausages such as frankfurters and bologna.

A comminuted vegetable is a puree of one single vegetable or a mixture of a puree of more than one vegetable.

A comminuted fruit is a puree of one single fruit or a mixture of a puree of more than one fruit.

DEFINITIONS

As used herein, the term "protein" is protein selected from the group consisting of vegetable proteins, dairy proteins, and mixtures thereof. The vegetable protein is selected from the group consisting of protein derived from legumes, soybeans, corn, peas, canola seeds, sunflower seeds, rice, amaranth, lupin, rape seeds, wheat, wheat gluten, and mixtures thereof, with the proviso that the vegetable protein is not exclusively wheat gluten. Thus, when wheat or wheat gluten is used as a protein source, it must be mixed with a protein selected from the group consisting of protein derived from legumes, soybeans, corn, peas, canola seeds, sunflower seeds, rice, amaranth, lupin, rape seeds, casein, caseinates, dairy whey protein, and mixtures thereof. A preferred vegetable protein is soy protein. Dairy proteins are selected from the group consisting of casein, caseinates, dairy whey protein, and mixtures thereof.

Corn protein materials that are useful in the present invention include corn gluten meal, and most preferably, zein. Corn gluten meal is obtained from conventional corn refining processes, and is commercially available. Corn gluten meal contains about 50% to about 60% corn protein and about 40% to about 50% starch. Zein is a commercially available purified corn protein which is produced by extracting corn gluten meal with a dilute alcohol, preferably dilute isopropyl alcohol.

As used herein, the term "soy protein" is defined as a material derived from whole soybeans which contains no non-soy derived additives. Such additives may, of course, be added to a soy protein to provide further functionality or nutrient content in an extruded meat analog containing the soy material. The term "soybean" refers to the species *Glycine max, Glycine soja*, or any species that is sexually cross compatible with *Glycine max*.

The term "protein content," as for example, soy protein content as used herein, refers to the relative protein content of a material as ascertained by A.O.C.S. (American Oil Chemists Society) Official Methods Bc 4-91(1997), Aa 5-91(1997), or Ba 4d-90(1997), each incorporated herein in its entirety by reference, which determine the total nitrogen content of a material sample as ammonia, and the protein content as 6.25 times the total nitrogen content of the sample.

The Nitrogen-Ammonia-Protein Modified Kjeldahl Method of A.O.C.S. Methods Bc4-91 (1997), Aa 5-91 (1997), and Ba 4d-90(1997) used in the determination of the protein content may be performed as follows with a soy material sample. From 0.0250-1.750 grams of the soy material are weighed into a standard Kjeldahl flask. A commercially available catalyst mixture of 16.7 grams potassium sulfate, 0.6 grams titanium dioxide, 0.01 grams of copper sulfate, and 0.3 grams of pumice is added to the flask, then 30 milliliters of concentrated sulfuric acid is added to the flask. Boiling stones are added to the mixture, and the sample is digested by heating the sample in a boiling water bath for approximately 45 minutes. The flask should be rotated at least 3 times during the digestion. Water (300 milliliters) is added to the sample, and the sample is cooled to room temperature. Standardized 0.5N hydrochloric acid and distilled water are added to a distillate receiving flask sufficient to cover the end of a distillation outlet tube at the bottom of the receiving flask. Sodium hydroxide solution is added to the digestion flask in an amount sufficient to make the digestion solution strongly alkaline. The digestion flask is then immediately connected to the distillation outlet tube, the contents of the digestion flask are thoroughly mixed by shaking, and heat is applied to the digestion flask at about a 7.5-min boil rate until at least 150 milliliters of distillate is collected. The contents of the receiving flask are then titrated with 0.25N sodium hydroxide solution using 3 or 4 drops of methyl red indicator solution—0.1% in ethyl alcohol. A blank determination of all the reagents is conducted simultaneously with the sample and similar in all respects, and correction is made for blank determined on the reagents. The moisture content of the ground sample is determined according to the procedure described below (A.O.C.S Official Method Ba 2a-38). The nitrogen content of the sample is determined according to the formula: Nitrogen (%)=1400.67×[[(Normality of standard acid)×(Volume of standard acid used for sample (ml))]−[(Volume of standard base needed to titrate 1 ml of standard acid minus volume of standard base needed to titrate reagent blank carried through method and distilled into 1 ml standard acid (ml))×(Normality of standard base)]−[(Volume of standard base used for the sample (ml))×(Normality of standard base)]]/(Milligrams of sample). The protein content is 6.25 times the nitrogen content of the sample.

The term "moisture content" as used herein refers to the amount of moisture in a material. The moisture content of a material can be determined by A.O.C.S. (American Oil Chemists Society) Method Ba 2a-38 (1997), which is incorporated herein by reference in its entirety. According to the method, the moisture content of a material may be measured by passing a 1000 gram sample of the ground material through a 6×6 riffle divider, available from Seedboro Equipment Co., Chicago, Ill., and reducing the sample size to 100 grams. The 100 gram sample is then immediately placed in an airtight container and weighed. Five grams of the sample ("Sample Weight") are weighed onto a tared moisture dish (minimum 30 gauge, approximately 50×20 millimeters, with a tight-fitting slip cover—available from Sargent-Welch Co.). The dish containing the sample is placed in a forced draft oven and dried at 130±3° C. for 2 hours. The dish is then removed from the oven, covered immediately, and cooled in a dissector to room temperature. The dish is then weighed to obtain a Dry Weight. Moisture content is calculated according to the formula: Moisture content (%)=100×[(Sample Weight−Dry Weight)/Sample Weight].

The term "weight on a moisture free basis" as used herein refers to the weight of a material after it has been dried to completely remove all moisture, e.g. the moisture content of the material is 0%. Specifically, the weight on a moisture free basis of a material can be obtained by weighing the material after the material has been placed in a 45° C. oven until the material reaches a constant weight.

The term "soy protein isolate" as used herein is used in the sense conventional to the soy protein industry. Specifically, a soy protein isolate is a soy material having a protein content of at least about 90% soy protein on a moisture free basis. "Isolated soy protein", as used in the art, has the same meaning as "soy protein isolate" as used herein and as used in the art. A soy protein isolate is formed from soybeans by removing the hull and germ of the soybean from the cotyledon, flaking or grinding the cotyledon and removing oil from the flaked or ground cotyledon, separating the soy protein and carbohydrates of the cotyledon from the cotyledon fiber, and subsequently separating the soy protein from the carbohydrates.

The term "soy protein concentrate" as used herein is used in the sense conventional to the soy protein industry. Specifically, a soy protein concentrate is a soy material having a protein content of from about 65% to less than about 90% soy protein on a moisture-free basis. Soy protein concentrate also contains soy cotyledon fiber, typically from about 3.5% up to about 20% soy cotyledon fiber by weight on a moisture-free basis. A soy protein concentrate is formed from soybeans by removing the hull and germ of the soybean from the cotyledon, flaking or grinding the cotyledon and removing oil from the flaked or ground cotyledon, and separating the soy protein and soy cotyledon fiber from the carbohydrates of the cotyledon.

The term "soy protein flour" as used herein, refers to a comminuted form of defatted soybean material, preferably containing less than about 1% oil, formed of particles having a size such that the particles can pass through a No. 100 mesh (U.S. Standard) screen. The soy cake, chips, flakes, meal, or mixture of the materials are comminuted into a soy flour using conventional soy grinding processes. Soy flour has a soy protein content of about 49% to about 60% on a moisture free basis. Preferably the flour is very finely ground, most preferably so that less than about 1% of the flour is retained on a 300 mesh (U.S. Standard) screen.

Rice is a starchy food containing from about 6% to about 10% protein. The term "rice flour" as used herein relates to an inexpensive by-product of rice milling obtained by grinding broken rice. Conventional milling practices produce rice flour composed largely of about 80% carbohydrates. Because of the low concentration of protein in rice and the resulting bulk required to obtain a satisfactory protein intake, infants and children cannot eat a sufficient amount to meet their protein requirements.

The term "starch" as used herein, is intended to include all starches derived from any native source, any of which may be suitable for use herein. A native starch as used herein, is one as it is found in nature. Also suitable are starches derived from a plant obtained by standard breeding techniques including crossbreeding, translocation, inversion, transformation or any other method of gene or chromosome engineering to include variations thereof. In addition, starch derived from a plant grown from artificial mutations and variations of the above generic composition, which may be produced by known standard methods of mutation breeding, are also suitable herein.

Typical sources for the starches are cereals, tubers, roots, legumes and fruits. The native source can be a waxy variety of corn (maize), pea, potato, sweet potato, banana, barley, wheat, rice, oat, sago, amaranth, tapioca (cassava), arrowroot, canna, and sorghum particularly maize, potato, cassava, and rice. As used herein, the term "waxy" or "low amylose" is intended to include a starch containing no more than about 10% by weight amylose. Particularly suitable in the invention are those starches which contain no more than about 5% amylose by weight.

The term "gluten free starch" relates to modified tapioca starch, the main ingredient in many of bakery mix products. Gluten free or substantially gluten free starches are made from wheat-, corn-, and tapioca-based starches and are "gluten-free" because they do not contain gluten from wheat, oats, rye or barley—a factor of particular importance for people diagnosed with celiac disease and/or wheat allergies.

The term "wheat flour" relates to a flour obtained from the milling of wheat. The particle size of wheat flour typically is from about 14-120 μm. Wheat flour typically contains from about 11.7 to about 14% protein and from about 3.7 to about 10.9% fiber.

The term "gluten" relates to a protein fraction in wheat flour, that possesses a high protein content as well as unique structural and adhesive properties. In its freshly extracted wet state it is known as gum gluten, and when thereafter dried it becomes a free-flowing powder of high protein content and bland taste. It is generally used in food processing in that form.

The term "fiber" as used herein refers to any vegetable or fruit fibers known in the art such as soy cotyledon fiber, soy hull fiber, oat fiber, and other cellulosic fibers. A preferred fiber is soy cotyledon fiber. The fibrous portion of soy cotyledons containing at least about 70% insoluble fiber (polysaccharide). Soy cotyledon fiber typically contains some minor amounts of soy protein, but may also be 100% fiber. To avoid confusion the term "fiber" as used herein (except in this paragraph) refers to fiber formed in the process of extruding a protein material, generally by protein-protein interactions, not soy cotyledon fiber. To further avoid confusion, soy cotyledon fiber will be referred to herein only as "soy cotyledon fiber" and not as "fiber." Soy cotyledon fiber is formed from soybeans by removing the hull and germ of the soybean from the cotyledon, flaking or grinding the cotyledon and removing oil from the flaked or ground cotyledon, and separating the soy cotyledon fiber from the soy material and carbohydrates of the cotyledon.

The term "fiber" as used herein refers to protein fiber, especially soy protein fiber, formed in the process of extruding a protein material, generally by protein-protein interactions. The protein-protein interactions are such that the proteins mainly interact or attach themselves primarily in a head to tail, or head to head, or tail to tail fashion. The protein-protein interactions are such that the proteins minimally interact or attach themselves in a side to side fashion. The physical size of the protein fibers are generally greater than about 4 centimeters in length. The width of the soy protein fibers are generally from about 0.5 centimeters up to about 1 centimeter wide. The thickness of the protein fibers generally are less than about 1 centimeter.

The term "strands" as used herein refers to protein strands, especially soy protein strands, also formed in the process of extruding a soy protein material, again generally by protein-protein interactions. The protein-protein interactions are such that the proteins interact or attach themselves in a head to tail, or head to head, or tail to tail fashion, but to a smaller degree than in protein fibers. The protein-protein interactions are such that the proteins interact or attach themselves in a side to side fashion, but to a larger degree than in protein fibers. The physical size of the protein strands are generally greater than about 3 centimeters in length. The width of the protein strands are generally from about 0.5 centimeters up to about 1 centimeter wide. The thickness of the protein strands are generally less than about 1 centimeter.

The term "chunks" as used herein refers to protein chunks, especially soy protein chunks, also formed in the process of extruding a protein material, again generally by protein-protein interactions. The protein-protein interactions are such that the proteins interact or attach themselves in a head to tail, or head to head, or tail to tail fashion, but to a smaller degree than in protein strands. The protein-protein interactions are such that the proteins interact or attach themselves in a side to side fashion, but to a larger degree than in protein strands. The physical size of the protein chunks are generally greater than about 2 centimeters in length. The width of the protein chucks are generally greater than about 2 centimeters. The thickness of the protein chunks are generally less than about 2 centimeters.

The term "large pieces" as used herein refers to the physical size of the protein composition, especially the soy protein composition. Large pieces comprise protein fibers, protein strands, and protein chunks. Within the protein composition, 75% of the protein composition, on a weight basis contains at least about 15 wt. % of large pieces. The large pieces are determined by a shred test. The procedure for the shred test is as follows: Weigh about 150 g of each protein composition example using whole pieces only, into a heat-sealable plastic bag and add about 450 g water at 25° C. Vacuum seal the bag at about 150 mm Hg and allow the contents to hydrate for 60 minutes. Place the hydrated sample in the bowl of a Kitchen Aid mixer model KM14G0 equipped with a single blade paddle and mix the contents at 130 rpm for 2 minutes. Scrape the paddle and the sides of the bowl, returning the scrapings to the bottom of the bowl. Repeat the mixing and scraping 2 times. Remove the mixture from the bowl and weigh it. Separate the mixture into 1 of 4 groups. Group 1 is the fiber group wherein the fibers are at least 4 cm long and at least 0.5 cm wide. Group 2 is the strand group wherein the strands are at least 3 cm long and at least 1 cm wide. Group 3 is the chunk group wherein the chunks are greater than 2 cm long and greater than 2 cm wide. The remaining mixture is Group 4. The percent large pieces are determined by adding the weight total of Group 1+Group 2+Group 3, multiplying by 100 and dividing by the weight total of Group 1+Group 2+Group 3+Group 4.

The term "shear strength" as used herein measures the ability of a textured protein to form a fibrous network with a strength high enough to impart meat-like texture and appearance to a formed product. Shear strength is measured in grams. The shear strength is determined by the following procedure: Weigh a sample of a protein composition and place it in a heat sealable pouch and hydrated it with a 3 times the sample weight with room temperature tap water. Evacuate and seal the pouch and permit the sample to hydrate for about 12 to about 24 hours. Remove the hydrated sample and place it on the texture analyzer base plate oriented so that a knife from the texture analyzer will cut through the diameter of the sample. Further, the sample should be oriented under the texture analyzer knife such that the knife cuts perpendicular to the long axis of the textured piece. The texture analyzer used to perform this test is a model TA. TXT2 manufactured by Stable Micro Systems Ltd. (England) equipped with a 25, 50, or 100 Kg load cell. The shear strength is the maximum force in grams needed to puncture through the sample. Each protein composition example is run 10 times and the average time is reported.

The term "hydration test" as used herein measures the amount of time in minutes necessary to hydrate a known amount of the protein composition. The hydration test is determined by the following procedure: From each protein composition example, select 80 individual pieces and weigh the total selected pieces. Add the pieces to a 5000 ml beaker and insert a smaller weighted beaker into the 5000 ml beaker such that all 80 pieces of sample are submerged for 30 minutes. Remove 10 pieces of sample from the water and make a traverse cut across each piece near its center. If the cut pieces at the traverse cut are dry, wait 10 minutes before removing 10 additional pieces. Make traverse cuts in the additional pieces and examine for hydration. If fully or completely hydrated, the hydration time is 40 minutes. If dry, keep removing pieces, make traverse cuts examine for hydration every 10 minutes until hydration is complete and record the hydration time.

The term "density" as used herein is intended to be construed as a density determined by the displacement of salt. The salt density is determined by the following procedure: All length measurements are in millimeters (mm), all volume measurements are in milliliters (ml) and all weight measurements are in grams (g). The salt is granular table salt having the following particle size distribution:

| US Mesh | Typical % retained on Screen |
| --- | --- |
| 30 | 2 (10) max |
| 40 | 37 |
| 50 | 52 |
| 60 | 3 |
| 70 | 1 |
| Pan | (10 max) |

Using a vessel having a known volume and known weight (tare), add the table salt (density of from about 1.29 g/cm$^3$ up to about 1.40 g/cm$^3$) to a depth of about 5 mm. Add a known weight amount of the protein composition on top of the salt, but not touching the walls of the vessel. Add table salt to the vessel to the point of overflow, tap the filled vessel on the table to pack the salt around the protein composition and using a spatula, level the salt flat with the rim of the vessel. Record the weight of the filled vessel and subtract out the weight of the vegetable protein composition and the tare weight to give the weight of the salt in the filled vessel. Divide the weight of the salt by its density to give the volume of salt in the filled vessel. From the known volume of the vessel, subtract the volume of salt to give the volume of the protein composition in the vessel. Divide the weight of the protein composition by the volume of the protein composition to obtain its density in g/cm3.

Particle size distribution is determined by using a RoTap sieve shaker manufactured by Tyler RoTap, of Mentor Ohio. The RoTap includes a shaker mechanism and a sieve stack positioned on the shaker mechanism, equipped with sieves of the above size.

The term "comminuted meat" as used herein refers to a meat paste that is recovered from an animal carcass. The meat, on or off the bone is forced through a deboning device such that meat is separated from the bone and reduced in size. The meat is separated from the meat/bone mixture by forcing through a cylinder with small diameter holes. The meat acts as a liquid and is forced through the holes while the remaining bone material remains behind. The fat content of the comminuted meat may be adjusted upward by the addition of animal fat.

The term "comminuted vegetable" as used herein refers to a vegetable puree.

The term "comminuted fruit" as used herein refers to a fruit puree.

The Protein Composition

The protein for the hydrated and shredded protein composition is selected from the group consisting of vegetable proteins, dairy proteins, and mixtures thereof. The vegetable protein is selected from the group consisting of protein derived from soybeans, corn, peas, canola seeds, sunflower seeds, rice, amaranth, lupin, rape seeds, wheat, wheat gluten, and mixtures thereof, with the proviso that the vegetable protein is not exclusively wheat gluten. Thus, when wheat or wheat gluten is used as a protein source, it must be mixed with a protein selected from the group consisting of protein derived from legumes, soybeans, corn, peas, canola seeds, sunflower seeds, rice, amaranth, lupin, rape seeds, casein, caseinates, dairy whey protein, and mixtures thereof.

A preferred vegetable protein is soy protein derived from soybeans. Dairy proteins are selected from the group consisting of casein, caseinates, dairy whey protein, and mixtures thereof.

The hydrated and shredded protein composition may be a wheat gluten-free protein composition. The hydrated and shredded protein composition may further comprise a component selected from the group consisting of a starch, gluten free starch, rice flour, wheat flour, wheat gluten, soy cotyledon fiber, and mixtures thereof. The protein preferably is derived from soybeans wherein the soy protein is selected from the group consisting of a soy protein isolate, a soy protein concentrate, a soy protein flour, and mixtures thereof.

It is further contemplated that the whole soybeans used in the process of the present invention may be standard, commoditized soybeans, soybeans that have been genetically modified (GM) in some manner, or non-GM identity preserved soybeans.

When the soy protein is selected from the group consisting of a soy protein isolate, a soy protein concentrate, a soy protein flour, and mixtures thereof is used, the soy protein may also include a soy cotyledon fiber that is present in the soy protein at about 1% to about 20% by weight on a moisture free basis with the remainder selected from the group consisting of the soy protein isolate, the soy protein concentrate, the soy protein flour, and mixtures thereof.

When from about 1% to about 20% by weight on a moisture free basis of a soy cotyledon fiber is used, the soy protein may also include from about 10% to about 40% by weight on a moisture free basis of a wheat gluten, with the remainder selected from the group consisting of a soy protein isolate, a soy protein concentrate, a soy protein flour, and mixtures thereof.

When from about 1% to about 20% by weight on a moisture free basis of a soy cotyledon fiber and from about 10% to about 40% by weight on a moisture free basis of a wheat gluten is used, the soy protein may also include from about 5% to about 15% by weight on a moisture free basis of a starch, with the remainder selected from the group consisting of a soy protein isolate, a soy protein concentrate, a soy protein flour, and mixtures thereof.

It has surprisingly been found that extrusion of one or more of a soy protein isolate, a soy protein concentrate, and a soy protein flour, with or without the above-named additional components, causes the formation of a product having an amount of large pieces of soy fiber, soy strands, and soy chunks. It also has been surprisingly found that the produced soy protein composition possesses a shear strength not previously present in the starting material. Further, there is a difference in hydration time and density of the soy protein composition obtained by extrusion versus any of the starting materials.

The addition of a hydrated soy isolate or a hydrated soy concentrate to MDM, a comminuted vegetable, or a comminuted fruit increases the overall protein content of the product. However, there is a minimal amount of structural integrity to this formed product. Further, the formed product cannot be made into shapes resembling for example, meat products. When a hydrated and shredded soy protein composition of this invention is combined with for example, MDM, a protein product is formed having the look, texture, and fibrosity of meat. Further, this protein product has twice the protein, less than half the calories, and less than one third the fat in comparison to the starting MDM.

As stated above, at least about 75% of the soy protein composition, on a weight basis, contains at least about 15 wt. % of large pieces after hydrating and shredding. Preferably, at least about 75% of the hydrated and shredded soy protein composition, on a weight basis, contains at least about 20 wt. % of large pieces. Most preferably, at least about 75% of the hydrated and shredded soy protein composition, on a weight basis, contains at least about 22 wt. % of large pieces. There are 3 categories of large pieces: fibers, strands, and chunks. In order for fibers to be present in the hydrated and shredded soy protein material, the fibers need to be greater than about 4 centimeters long. The width of the soy protein fibers are generally from about 0.5 centimeters up to about 1 centimeter wide. The thickness of the soy protein fibers generally are from about 2 millimeters up to about 5 millimeters. In order for strands to be present in the hydrated and shredded soy protein material, the strands need to be greater than about 3 centimeters long. The width of the soy protein strands are generally from about 0.5 centimeters up to about 1 centimeter wide. The thickness of the soy protein strands generally are from about 2 millimeters up to about 5 millimeters. In order for chunks to be present in the hydrated and shredded soy protein material, the chunks need to be greater than about 2 centimeters long. The width of the soy protein chucks are generally greater than about 2 centimeters. The thickness of the soy protein chunks generally are from about 2 millimeters up to about 5 millimeters.

As stated above, at least about 75% of the hydrated and shredded soy protein composition, on a weight basis has a shear strength of at least about 1400 grams. Preferably, at least about 75% of the hydrated and shredded soy protein composition, on a weight basis, has a shear strength of at least about 1800 grams. Most preferably, at least about 75% of the hydrated and shredded soy protein composition, on a weight basis, has a shear strength of at least about 2000 grams.

The hydrated and shredded protein composition as a soy protein composition is produced by extruding one or more of the soy protein isolate, soy protein concentrate and soy protein flour either by itself or with one or more of the above named components of a starch, gluten free starch, rice flour, wheat flour, and wheat gluten, and soy cotyledon fiber. The hydrated and shredded protein composition as a soy protein composition has a moisture content of from about 5% to about 80%. Moisture conditions employed in producing the soy protein composition are low moisture soy protein composition (about 5% to about 35%) and high moisture soy protein composition (about 50% to about 80%). In producing a hydrated and shredded soy protein composition, the above ingredients are heated along with water under increasing temperature, pressure and shear conditions in a cooker extruder, and the ingredient mixture is extruded through a die. Upon extrusion, the extrudate generally expands to form a fibrous cellular structure as it enters a medium of reduced pressure (usually atmospheric). Extrusion methods for forming fibrous cellular structures are well known and disclosed, for example, in U.S. Pat. No. 4,099,455.

The protein content of the hydrated and shredded protein composition, irrespective of being a low moisture protein composition or a high moisture protein composition is from about 30% to about 90% by weight on a moisture free basis. For a low moisture hydrated and shredded protein composition, the protein content, including the moisture, is at least about 50% to about 90% by weight. For a high moisture hydrated and shredded protein composition, the protein content, including the moisture, is from about 30% to less than 50% by weight.

Furthermore, when a soy protein isolate is used, the soy protein isolate should not be a highly hydrolyzed soy protein isolate having a low molecular weight distribution since highly hydrolyzed soy protein isolates lack the protein chain length to properly form protein fibers in the process. Highly hydrolyzed soy protein isolates, however, may be used in combination with other soy protein isolates provided that the highly hydrolyzed soy protein isolate content of the combined soy protein isolates is less than about 40% of the combined soy protein isolates, by weight.

The soy protein isolate utilized should have a water holding capacity sufficient to enable the protein in the isolate to form fibers upon extrusion. Examples of soy protein isolates that are useful in the present invention are commercially available, for example, from Solae, LLC (St. Louis, Mo.), and include SUPRO® 500E, SUPRO® EX 33, SUPRO® 620, SUPRO® 630 and SUPRO® 545.

Soy protein isolates useful in the soy protein composition may be produced from soybeans according to conventional processes in the soy protein manufacturing industry. Exemplary of such a process, whole commodity soybeans are initially detrashed, cracked, dehulled, degermed, and defatted according to conventional processes to form soy flakes, soy flour, soy grits, or soy meal. The soybeans may be detrashed by passing the soybeans through a magnetic separator to remove iron, steel, and other magnetically susceptible objects, followed by shaking the soybeans on progressively smaller meshed screens to remove soil residues, pods, stems, weed seeds, undersized beans, and other trash. The detrashed soybeans may be cracked by passing the soybeans through cracking rolls. Cracking rolls are spiral-cut corrugated cylinders which loosen the hull as the soybeans pass through the rolls and crack the soybean material into several pieces. The cracked soybeans may then be dehulled by aspiration. The dehulled soybeans are degermed by shaking the dehulled soybeans on a screen of sufficiently small mesh size to remove the small sized germ and retain the larger cotyledons of the beans. The cotyledons are then flaked by passing the cotyledons through a flaking roll. The flaked cotyledons are defatted by extracting oil from the flakes by contacting the flakes with hexane or other suitable lipophilic/hydrophobic solvent. The edible defatted flakes are then milled, usually in an open-loop grinding system, by a hammer mill, classifier mill, roller mill or impact pin mill first into grits, and with additional grinding, to form a soy meal, or a soy flour, with desired particle sizes. Screening is typically used to size the product to uniform particle size ranges, and can be accomplished with shaker screens or cylindrical centrifugal screeners.

The defatted soy flakes, soy flour, soy grits, or soy meal is/are then extracted with an aqueous alkaline solution, typically a dilute aqueous sodium hydroxide solution having a pH of from 7.5 to 11.0, to extract protein soluble in an aqueous alkaline solution from insolubles. The insolubles are soy cotyledon fiber which is composed primarily of insoluble carbohydrates. An aqueous alkaline extract containing the soluble protein is subsequently separated from the insolubles, and the extract is then treated with an acid to lower the pH of the extract to around the isoelectric point of the soy protein, preferably to a pH of from 4.0 to 5.0, and most preferably to a pH of from 4.4 to 4.6. The soy protein precipitates from the acidified extract due to the lack of solubility of the protein in an aqueous solution at or near its isoelectric point. The precipitated protein curd is then separated from the remaining extract (whey). The separated protein may be washed with water to remove residual soluble carbohydrates and ash from the protein material. Water is added to the precipitated protein curd and the pH of the curd is adjusted to between about 6.5 and about 7.5. The separated protein is then dried using conventional drying means such as spray drying or tunnel drying to form a soy protein isolate.

Soy protein concentrate may be blended with the soy protein isolate to substitute for a portion of the soy protein isolate as a source of soy protein. Preferably, if a soy protein concentrate is substituted for a portion of the soy protein isolate, the soy protein concentrate is substituted for up to about 40% of the soy protein isolate by weight, at most, and more preferably is substituted for up to about 30% of the soy protein isolate by weight.

Soy protein concentrates useful in the soy protein composition are commercially available. For example, soy protein concentrates Promine® DSPC, Response®, Procon®, Alpha™ 12 and Alpha™ 5800 are available from Solae, LLC (St. Louis, Mo.). Soy protein concentrates useful in the present invention may also be produced from commodity soybeans according to conventional processes in the soy protein manufacturing industry. For example, defatted soy flakes, soy flour, soy grits, or soy meal produced as described above may be washed with aqueous ethanol (preferably about 60% to about 80% aqueous ethanol) to remove soluble carbohydrates from the soy protein and soy fiber. The soy protein and soy fiber containing material is subsequently dried to produce the soy protein concentrate. Alternatively, the defatted soy flakes, soy flour, soy grits, or soy meal may be washed with an aqueous acidic wash having a pH of from about 4.3 to about 4.8 to remove soluble carbohydrates from the soy protein and soy fiber. After removing the soluble carbohydrates, water is added and the pH is adjusted to between about 6.5 and about 7.5. The soy protein and soy fiber containing material is subsequently dried to produce the soy protein concentrate.

The soy cotyledon fiber utilized in the hydrated and shredded protein composition should effectively bind water when the mixture of soy protein and soy cotyledon fiber are co-extruded. By binding water, the soy cotyledon fiber induces a viscosity gradient across the extrudate as the extrudate is extruded through a cooling die, thereby promoting the formation of protein fibers. To effectively bind water for the purposes of the process of the present invention, the soy cotyledon fiber should have a water holding capacity of at least 5.50 grams of water per gram of soy cotyledon fiber, and preferably the soy cotyledon fiber has a water holding capacity of at least about 6.0 grams of water per gram of soy cotyledon fiber. It is also preferable that the soy cotyledon fiber has a water holding capacity of at most about 8.0 grams of water per gram of soy cotyledon fiber.

The soy cotyledon fiber is a complex carbohydrate and is commercially available. For example, FIBRIM® 1260 and FIBRIM® 2000 are soy cotyledon fiber materials that are commercially available from Solae, LLC (St. Louis, Mo.) that work well in the process of the present invention. Soy cotyledon fiber useful in the process of the present invention may also be produced according to conventional processes in the soy processing industry. For example, defatted soy flakes, soy flour, soy grits, or soy meal produced as described above may be extracted with an aqueous alkaline solution as described above with respect to the production of a soy protein isolate to separate the insoluble soy cotyledon fiber from the aqueous alkaline soluble soy protein and carbohydrates. The separated soy cotyledon fiber is then dried, preferably by spray drying, to produce a soy cotyledon fiber product. Soy cotyledon fiber is generally present in the soy protein composition at from about 1% to about 20%, preferably at from about 1.5% to about 20% and most preferably at from about 2% to about 5% by weight on a moisture free basis.

A modest concentration of soy fiber is believed to be effective in obstructing cross-linking of protein molecules, thus preventing excessive gel strength from developing in the cooked extrusion mass exiting the die. Unlike the protein, which also absorbs moisture, soy fiber readily releases moisture upon release of pressure at the die exit temperature.

Wheat gluten may be used as an ingredient to be mixed and extruded within hydrated and shredded the protein. Wheat gluten provides an economical source of protein, and may be combined with a portion of the protein within the hydrated and shredded protein composition. The protein in wheat gluten has a very low water holding capacity and is ineffective to form significant protein fibers by itself upon extrusion. Wheat gluten is a commercially available ingredient. A commercially available wheat gluten useful in the present invention is Gem of the Star Gluten, available from Manildra Milling.

A starch material may also be used as an ingredient to be mixed and extruded within the hydrated and shredded protein composition. Starch may be used to provide texture to the hydrated and shredded protein composition that is produced by extrusion. The starch material used is preferably a naturally occurring starch. The starch material may be isolated from a variety of plants such as corn, wheat, potato, rice, arrowroot, and cassava by well-known, conventional methods. Starch materials useful in the process of the present invention include the following commercially available starches: corn, wheat, potato, rice, high amylose corn, waxy maize, arrowroot, and tapioca. Preferably the starch material used is a corn starch or a wheat starch, and most preferably is a commercially available dent corn starch or native wheat starch. A dent corn starch is commercially available from A. E. Staley Mfg., Co. sold as Dent Corn Starch, Type IV, Pearl.

Additionally, flavor ingredients may be mixed and extruded within the hydrated and shredded protein composition. The preferred flavor ingredients are those that provide a meat-like flavor to the hydrated and shredded protein material produced by extrusion. Preferred flavor ingredients include beef flavor, chicken flavor, grill flavor, and malt extract, all commercially available from flavor ingredient manufacturers. Mixtures of these ingredients may also be used.

The hydrated and shredded protein composition may also include one or more optional constituents such as an antioxidant, or an antimicrobial agent. Antioxidant additives include BHA, BHT, TBHQ, vitamins A, C and E and derivatives, and various plant extracts such as those containing carotenoids, tocopherols or flavonoids having antioxidant properties, may be included to increase the shelf-life of the food and meat product. The hydrated and shredded protein composition may also further comprise a colorant selected from the group consisting of titanium dioxide, caramel coloring, and mixtures thereof.

Antimicrobial agents are selected from the group consisting of sodium lactate, potassium lactate, sodium diacetate, potassium diacetate, sorbic acid and its potassium salt, and mixtures thereof.

The antioxidants and the antimicrobial agents may have a combined presence at levels of from about 0.01% to about 10%, preferably from about 0.05% to about 5%, and more preferably from about 0.1% to about 2%, by weight of the restructured meat product.

A suitable extrusion process for the preparation of a low moisture hydrated and shredded protein composition such as a low moisture hydrated and shredded soy protein composition comprises introducing the particular ingredients that comprise the hydrated and shredded soy protein composition into a mixing tank (i.e., an ingredient blender) to combine the ingredients and form a dry blended soy protein material pre-mix. The dry blended soy protein material pre-mix is then transferred to a hopper from which the dry blended ingredients are introduced along with moisture into a pre-conditioner to form a conditioned soy protein material mixture. The conditioned soy protein material is then fed to an extrusion apparatus (i.e., extruder) in which the soy protein material mixture is processed under mechanical pressure generated by the screws of the extruder to form a molten extrusion mass. The molten extrusion mass exits the extruder through an extrusion die.

In the pre-conditioner, the particulate solid ingredient mix is blended with water to allow the moisture to penetrate and soften the individual particles. The preconditioning step increases the bulk density of the particulate fibrous material mixture. The preconditioner contains one or more paddles to promote uniform mixing of the protein and transfer of the protein mixture through the preconditioner.

Typically, the soy protein material mixture is pre-conditioned prior to introduction into the extrusion apparatus by contacting the pre-mix with moisture (i.e., steam and/or water) at a temperature of at least about 45° C. (110° F.). It has been observed, however, that higher temperatures (i.e., temperatures above about 85° C. (185° F.)) in the preconditioner may encourage starches to gelatinize, which in turn may cause lumps to form, which may impede flow of the protein mixture from the preconditioner to the extruder barrel.

Typically, the soy protein material pre-mix is conditioned for a period of about 30 to about 60 seconds, depending on the speed and the size of the conditioner. The soy protein composition pre-mix is contacted with steam and/or water and heated in the pre-conditioner at generally constant steam flow to achieve the desired temperatures. The water and/or steam conditions (i.e., hydrates) the soy protein material mixture, increases its density, and facilitates the flowability of the dried mix without interference prior to introduction to the extruder barrel where the proteins are structured.

The conditioned pre-mix may contain from about 5% to about 30% (by weight) water. The conditioned pre-mix typically has a bulk density of from about 0.25 g/cm$^3$ to about 0.6 g/cm$^3$. Generally, as the bulk density of the pre-conditioned protein mixture increases within this range, the protein mixture is easier to process.

The conditioned pre-mix is generally introduced to the extrusion apparatus at a rate of no more than about 30 kilograms (kg)/min (no more than about 65 lbs/min). Generally, it has been observed that the density of the extrudate decreases as the protein rate of pre-mix to the extruder increases.

Extrusion devices have long been used in the manufacture of a wide variety of edible products. One suitable extrusion device is a double-barrel, twin screw extruder as described, for example, in U.S. Pat. No. 4,600,311. Examples of commercially available double-barrel, twin screw extrusion apparatus include a CLEXTRAL® Model BC-72 extruder manufactured by Clextral, Inc. (Tampa, Fla.); a WENGER Model TX-57 extruder manufactured by Wenger (Sabetha, Kans.); and a WENGER Model TX-52 extruder manufactured by Wenger (Sabetha, Kans.). Other conventional extruders suitable for use in this invention are described, for example, in U.S. Pat. Nos. 4,763,569, 4,118,164, and 3,117,006, which are incorporated by reference.

The screws of a twin screw extruder can rotate within the barrel in the same or opposite directions. Rotation of the screws in the same direction is referred to as single flow whereas rotation of the screws in opposite directions is referred to as double flow. The speed of the screw or screws of the extruder may vary depending on the particular apparatus. However, the screw speed is typically from about 250 to about 350 revolutions per minute (rpm). Generally, as the screw speed increases, the density of the extrudate decreases.

The extrusion apparatus generally comprises a plurality of temperature controlled zones through which the protein mixture is conveyed under mechanical pressure prior to exiting the extrusion apparatus through an extrusion die. The temperature in each successive temperature controlled zone generally exceeds the temperature of the previous temperature controlled zone by between about 10° C. and about 70° C. (between about 15° F. and about 125° F.). In one embodiment, the conditioned pre-mix is transferred through four temperature controlled zones within the extrusion apparatus, with the protein mixture heated to a temperature of from about 100° C. to about 150° C. (from about 212° F. to about 302° F.) such that the molten extrusion mass enters the extrusion die at a temperature of from about 100° C. to about 150° C. (from about 212° F. to about 302° F.).

The pressure within the extruder barrel is not narrowly critical. Typically the extrusion mass is subjected to a pressure of at least about 400 psig (about 28 bar) and generally the pressure within the last two heating zones is from about 1000 psig to about 3000 psig (from about 70 bar to about 210 bar). The barrel pressure is dependent on numerous factors including, for example, the extruder screw speed, feed rate of the mixture to the barrel, feed rate of water to the barrel, and the viscosity of the molten mass within the barrel.

Water is injected into the extruder barrel to hydrate the soy protein material mixture and promote texturization of the proteins. As an aid in forming the molten extrusion mass the water may act as a plasticizing agent. Water may be introduced to the extruder barrel via one or more injection jets or ports. Typically, the mixture in the barrel contains from about 15% to about 35% by weight water. The rate of introduction of water into the barrel is generally controlled to promote production of an extrudate having desired characteristics.

The molten extrusion mass in the extrusion apparatus is extruded through a die to produce an extrudate, which may then be dried in a dryer.

Extrusion conditions are generally such that the product emerging from the extruder barrel typically has a moisture content of from about 20% to about 45% (by weight) wet basis. The moisture content is derived from water present in the mixture introduced to the extruder, moisture added during preconditioning and/or any water injected into the extruder barrel during processing.

Upon release of pressure, the molten extrusion mass exits the extruder barrel through the die, superheated water present in the mass flashes off as steam, causing simultaneous expansion (i.e., puffing) of the material. The level of expansion of the extrudate upon exiting of the mixture from the extruder in terms of the ratio of the cross-sectional area of extrudate to the cross-sectional area of die openings is generally less than about 15:1. Typically, the ratio of the cross-sectional area of extrudate to the cross-sectional area of die openings is from about 3:1 to about 11:1.

The extrudate is cut after exiting the die. Suitable apparatus for cutting the extrudate include flexible knives manufactured by Wenger (Sabetha, Kans.) and Clextral® (Tampa, Fla.).

The dryer, if one is used for the low moisture soy protein composition, to dry the extrudates generally comprises a plurality of drying zones in which the air temperature may vary. Generally, the temperature of the air within one or more of the zones will be from about 135° C. to about 185° C. (from about 280° F. to about 370° F.). Typically, the extrudate is present in the dryer for a time sufficient to provide an extrudate having a desired moisture content. This desired moisture content may vary widely depending on the intended application of the extrudate and, typically, is from about 5% to about 35% by weight, more preferably from about 6% to about 13% by weight. Generally, the extrudate is dried for at least about 5 minutes and, more generally, for at least about 10 minutes. Suitable dryers include those manufactured by Wolverine Proctor & Schwartz (Merrimac, Mass.), National Drying Machinery Co. (Philadelphia, Pa.), Wenger (Sabetha, Kans.), Clextral® (Tampa, Fla.), and Buehler (Lake Bluff, Ill.).

The dried extrudates may further be comminuted to reduce the average particle size of the extrudate. Suitable grinding apparatus include hammer mills such as Mikro Hammer Mills manufactured by Hosokawa Micron® Ltd. (England).

Prior to combining the low moisture dried extrudate with the comminuted meat, or the comminuted vegetable, or the comminuted fruit, the extrudate having a moisture content of from about 6% to about 13% by weight, if dried, needs to be hydrated in water until the water is absorbed and shredded until the fibers are separated. If the extrudate is not dried or not fully dried, its moisture content is higher, generally from about 16% to about 30% by weight, on a moisture free basis. The non-dried or not fully dried extrudate needs to be hydrated prior to combining with the comminuted meat, or the comminuted vegetable, or the comminuted fruit, followed by shredding. However, when a non-dried or not fully dried extrudate is used, less water is necessary for hydrating the extrudate and hydration of the extrudate occurs much faster.

The ingredients employed to make a low moisture hydrated and shredded protein composition of from about 5% to about 35% moisture by weight, are also used to make a high moisture hydrated and shredded protein composition of from about 50% to about 80% moisture by weight. The soy protein, soy cotyledon fiber and other ingredients are dry blended and mixed in a mixing tank to combine the ingredients and form a dry blended soy protein material pre-mix. Alternatively, the soy protein, soy cotyledon fiber and other ingredients may be mixed directly with water to form a dough, without being dry blended first, preferably in a preconditioner.

Preferably the dough mixture including the dry ingredients and the water is conditioned for extrusion in the preconditioner by heating the dough mixture. Preferably the dough mixture is heated to a temperature of from about 50° C. (122° F.) to about 80° C. (176° F.), more preferably from about 60° C. (140° F.) to about 75° C. (167° F.) in the preconditioner.

The dough mixture is then fed into a cooking extruder to heat, shear, and, ultimately, to plasticize the dough mixture. The cooking extruder may be selected from commercially available cooking extruders. Preferably the cooking extruder is a single screw extruder, or more preferably a twin screw extruder, that mechanically shears the dough with the screw elements. Commercially available cooking extruders useful in the practice of the present invention include Clextral® extruders, commercially available from Clextral, Inc., Tampa, Fla.; Wenger extruders, commercially available from Wenger, Inc, Sabetha, Kans.; and Evolum® extruders, commercially available from Clextral, Inc. A particularly preferred cooking extruder for the practice of the present invention is a Clextral® BC72 cooking extruder, available from Clextal, Inc. Another preferred cooking extruder for the practice of the present invention is an EV32 twin screw extruder from Evolum®.

The dough mixture is subjected to shear and pressure by the cooking extruder to plasticize the dough mixture. The screw elements of the cooking extruder shear the dough mixture as well as create pressure in the extruder by forcing the dough mixture forward though the extruder and through the die. The screw motor speed determines the amount of shear and pressure applied to the dough mixture by the screw(s). Preferably the screw motor speed is set to a speed of from about 200 rpm to about 500 rpm, and more preferably from about 300 rpm to about 400 rpm, which moves the dough mixture through the extruder at a rate of at least about 20 kilograms per hour, and more preferably at least about 40 kilograms per hour. Preferably the cooking extruder generates an extruder barrel exit pressure of from about 500 to about 1500 psig, and more preferably an extruder barrel exit pressure of from about 600 to about 1000 psig is generated.

The dough mixture is heated by the cooking extruder as it passes through the extruder. Heating denatures the protein in the dough mixture enabling the dough mixture to plasticize. The cooking extruder includes a means for heating the dough mixture to temperatures of from about 100° C. (212° F.) to about 180° C. (356° F.). Preferably the means for heating the dough mixture in the cooking extruder comprises extruder barrel jackets into which heating or cooling media such as steam or water may be introduced to control the temperature of the dough mixture passing through the extruder. The cooking extruder may also include steam injection ports for directly injecting steam into the dough mixture within the extruder. The cooking extruder preferably includes multiple heating zones that can be controlled to independent temperatures, where the temperatures of the heating zones are preferably set to increase the temperature of the dough mixture as the dough mixture proceeds through the extruder. For example, the cooking extruder may be set in a four temperature zone arrangement, where the first zone (adjacent the extruder inlet port) is set to a temperature of from about 80° C. (176° F.) to about 100° C. (212° F.), the second zone is set to a temperature of from about 100° C. (212° F.) to 135° C. (275° F.), the third zone is set to a temperature of from 135° C. (275° F.) to about 150° C. (302° F.), and the fourth zone (adjacent the extruder exit port) is set to a temperature of from 150° C. (302° F.) to 180° C. (356° F.). The cooking extruder may be set in other temperature zone arrangements, as desired. For example, the cooking extruder may be set in a five temperature zone arrangement, where the first zone is set to a temperature of about 25° C. (77° F.), the second zone is set to a temperature of about 50° C. (122° F.), the third zone is set to a temperature of about 95° C. (203° F.), the fourth zone is set to a temperature of about 130° C. (266° F.), and the fifth zone is set to a temperature of about 150° C. (302° F.).

A long cooling die is attached to the cooking extruder so the plasticized dough mixture flows from the extruder through the cooling die upon exiting the extruder exit port. The dough mixture forms a melted plasticized mass in the cooking extruder that flows from the cooking extruder into the die. The cooling die cools and shapes the hot dough mixture as it exits cooking extruder. Fiber formation is induced in the plasticized dough mixture by the cooling effect of the cooling die to form the fibrous meat analog product. The fibrous material exits the cooling die through at least one aperture in the die face, which may be a die plate affixed to the die. The fibrous material extrudate is cut into desired lengths with a cutting knife positioned adjacent the die aperture(s) to cut the extrudate as it exits the die aperture(s).

The cooling die is maintained at a temperature significantly cooler than the temperature in the cooking extruder in the final temperature zone of the extruder adjacent the die. The cooling die includes means for maintaining the temperature at a temperature significantly cooler than the exit temperature of the cooking extruder. Preferably the cooling die includes inlet and outlet ports for circulating media for maintaining the die temperature. Most preferably, constant temperature water is circulated through the cooling die as the circulating media for maintaining the desired die temperature. Preferably, the cooling die is maintained at a temperature of from about 80° C. (176° F.) to about 110° C. (230° F.), more preferably the cooling die is maintained at a temperature of from about 85° C. (185° F.) to about 105° C. (221° F.), and most preferably the cooling die is maintained at a temperature of from about 90° C. (194° F.) to about 100° C. (212° F.).

The cooling die is preferably a long cooling die to ensure that the plasticized dough material is cooled sufficiently in transit through the die to induce proper fiber formation. In a preferred embodiment, the die is at least about 200 millimeters long, and more preferably is at least about 500 millimeters long. Long cooling dies useful in the practice of the process of the present invention are commercially available, for example from Clextral®, Inc., E. I. duPont de Nemours and Company, and Kobe Steel, Ltd.

The width and height dimensions of the cooling die aperture(s) are selected and set prior to extrusion of the dough mixture to provide the fibrous material extrudate with the desired dimensions. The width of the die aperture(s) may be set so that the extrudate resembles from a cubic chunk of meat to a steak filet, where widening the width of the die aperture(s) decreases the cubic chunk-like nature of the extrudate and increases the filet-like nature of the extrudate. Preferably the width of the cooling die aperture(s) is/are set to a width of from about 10 millimeters to about 40 millimeters, and most preferably from about 25 millimeters to about 30 millimeters.

The height dimension of the cooling die aperture(s) may be set to provide the desired thickness of the extrudate. The height of the aperture(s) may be set to provide a very thin extrudate or a thick extrudate. A novel feature of the present invention is that the height of the aperture(s) may be set to at least about 12 millimeters, and the resulting extrudate is fibrous across the entirety of any cross-section of the extrudate. Prior to the present invention, high moisture extrudates having a thickness of at least about 12 millimeters (as determined by the height of the cooling die aperture(s)) gelled in the center of the extrudate, and were not fibrous across the entirety of a transverse cross-section of the extrudate. Preferably, the height of the cooling die aperture(s) may be set to from about 1 millimeter to about 30 millimeters, and more preferably from about 12 millimeters to about 25 millimeters, and most preferably from about 15 millimeters to 20 about millimeters.

Due to the high moisture content of the dough mixture, little dissipation of energy and expansion occurs in the soy protein composition extrudate as it exits the die aperture(s). As a result, the soy protein composition is relatively dense compared to a low moisture extrudate, since few air vacuoles are introduced into the soy protein composition extrudate by expansion of the extrudate upon extrusion from the die.

One example of an extrudate containing soy protein and soy cotyledon fiber for use in the restructured meat product described herein is FXP MO339, available from Solae LLC (St. Louis, Mo.). FXP MO339 is an extruded dry textured soy protein product with suitable fibrosity and texture, and a suitable amount of soy protein. Specifically, FXP MO339 comprises about 59% by weight soy protein, about 2% by weight of fiber, about 25% by weight of wheat gluten, about 10% by weight of starch, about 0.1% L-cysteine, about 0.5% dicalcium phosphate and about 5.2% by weight moisture. Another example of an extrudate containing soy protein and soy cotyledon fiber for use in the restructured meat product described herein is VETEX® 1000, available from Stentorian Industries Company Limited (Taiwan).

The following examples are directed to the preparation of a low moisture extrudate, that when hydrated and shredded produces a low moisture hydrated and shredded soy protein composition.

Example 1

Added to a dry blend mixing tank are the following: 1000 kg Supro 620, 440 kg wheat gluten, 171 kg wheat starch, 34 kg soy cotyledon fiber, 9 kg dicalcium phosphate, and 1 kg L-cysteine. The contents are mixed to form a dry blended soy protein mixture. The dry blend is then transferred to a hopper from which the dry blend is introduced into a pre-conditioner along with 480 kg of water to form a conditioned soy protein pre-mixture. The conditioned soy protein pre-mixture is then fed to a twin screw extrusion apparatus at a rate of not more than 25 kg/minute. The extrusion apparatus comprises six temperature control zones, with the protein mixture being controlled to a temperature of from about 100° C. (212° F.) in the first zone up to about 150° C. (302° F.) in the sixth zone. The extrusion mass is subjected to a pressure of at least about 28 bar in the first zone up about 210 bar in the fourth zone. Water, 60 kg, is injected into the extruder barrel, via one or more injection jets in communication with a heating zone. The molten extruder mass exits the extruder barrel through a die and the moisture present in the mass flashes off as steam, causing expansion of the material. As the mass exits the die, it is cut with rotating knives and the cut mass is then dried to a moisture content of about 10% by weight.

Examples 2-92 are Repeats of Example 1

The below Table III delineates the analyses of the above Examples.

TABLE III

| Example Number# | % Large Pieces | Shear Texture (g) | Hydation (min.) | Density (g/cc) |
| --- | --- | --- | --- | --- |
| 1 | 30.2 | 2150 | 80 | 0.27 |
| 2 | 24.2 | 2366 | 80 | 0.24 |
| 3 | 29.4 | 2341 | 60 | 0.30 |
| 4 | 26.0 | 2142 | 70 | 0.29 |
| 5 | 27.1 | 2291 | 70 | 0.28 |
| 6 | 32.7 | 2442 | 70 | 0.23 |
| 7 | 17.4 | 2668 | 70 | 0.27 |
| 8 | 26.1 | 2511 | 90 | 0.26 |
| 9 | 21.1 | 2260 | 80 | 0.28 |
| 10 | 22.3 | 2421 | 80 | 0.24 |
| 11 | 21.9 | 2490 | 75 | 0.28 |
| 12 | 22.4 | 2438 | 104 | 0.28 |
| 13 | 17.8 | 2159 | 81 | 0.30 |
| 14 | 27.3 | 2675 | 83 | 0.28 |
| 15 | 29.3 | 2553 | 100 | 0.24 |
| 16 | 27.3 | 2226 | 90 | 0.23 |
| 17 | 23.5 | 2412 | 72 | 0.24 |
| 18 | 40.0 | 2055 | 100 | 0.23 |
| 19 | 32.6 | 2511 | 75 | 0.25 |
| 20 | 22.7 | 2168 | 100 | 0.25 |
| 21 | 22.0 | 2207 | 102 | 0.25 |
| 22 | 27.7 | 2247 | 62 | 0.29 |

TABLE III-continued

| Example Number# | % Large Pieces | Shear Texture (g) | Hydation (min.) | Density (g/cc) |
|---|---|---|---|---|
| 23 | 31.2 | 2151 | 73 | 0.28 |
| 24 | 30.2 | 2164 | 63 | 0.27 |
| 25 | 26.6 | 1966 | 68 | 0.28 |
| 26 | 24.9 | 2164 | 50 | 0.31 |
| 27 | 25.0 | 1812 | 58 | 0.28 |
| 28 | 19.6 | 2108 | 60 | 0.31 |
| 29 | 15.8 | 1864 | 70 | 0.27 |
| 30 | 26.5 | 2473 | 58 | 0.25 |
| 31 | 20.7 | 1879 | 65 | 0.28 |
| 32 | 25.4 | 1688 | 70 | 0.29 |
| 33 | 20.3 | 2038 | 74 | 0.26 |
| 34 | 39.3 | 2074 | 73 | 0.28 |
| 35 | 11.5 | 1937 | 70 | 0.39 |
| 36 | 32.5 | 1462 | 77 | 0.40 |
| 37 | 30.1 | 2051 | 66 | 0.28 |
| 38 | 27.9 | 2384 | 54 | 0.31 |
| 39 | 28.1 | 2064 | 58 | 0.28 |
| 40 | 29.2 | 2158 | 60 | 0.27 |
| 41 | 20.0 | 1834 | 58 | 0.28 |
| 42 | 26.8 | 2202 | 58 | 0.28 |
| 43 | 32.8 | 2363 | 57 | 0.26 |
| 44 | 33.9 | 2361 | 57 | 0.28 |
| 45 | 36.9 | 2293 | 103 | 0.25 |
| 46 | 26.3 | 2205 | 73 | 0.28 |
| 47 | 19.0 | 2286 | 53 | 0.29 |
| 48 | 22.6 | 2206 | 63 | 0.25 |
| 49 | 30.5 | 2125 | 63 | 0.31 |
| 50 | 25.5 | 2290 | 55 | 0.29 |
| 51 | 38.2 | 2274 | 55 | 0.26 |
| 52 | 31.5 | 2205 | 42 | 0.33 |
| 53 | 31.3 | 2185 | 55 | 0.31 |
| 54 | 31.8 | 1969 | 40 | 0.30 |
| 55 | 19.1 | 2028 | 55 | 0.31 |
| 56 | 17.2 | 1598 | 63 | 0.37 |
| 57 | 28.3 | 1869 | 60 | 0.31 |
| 58 | 29.7 | 2044 | 50 | 0.29 |
| 59 | 27.6 | 2216 | 52 | 0.28 |
| 60 | 25.0 | 2001 | 53 | 0.28 |
| 61 | 28.1 | 2096 | 45 | 0.27 |
| 62 | 19.0 | 1796 | 53 | 0.27 |
| 63 | 20.0 | 1924 | 51 | 0.27 |
| 64 | 23.7 | 2295 | 51 | 0.28 |
| 65 | 17.4 | 2259 | 50 | 0.29 |
| 66 | 29.2 | 2204 | 43 | 0.28 |
| 67 | 25.3 | 2059 | 38 | 0.31 |
| 68 | 26.1 | 2284 | 70 | 0.32 |
| 69 | 23.6 | 2085 | 70 | 0.30 |
| 70 | 25.6 | 2279 | 44 | 0.28 |
| 71 | 23.7 | 2170 | 44 | 0.32 |
| 72 | 31.2 | 2128 | 49 | 0.29 |
| 73 | 32.4 | 2068 | 50 | 0.29 |
| 74 | 40.1 | 1939 | 40 | 0.30 |
| 75 | 28.7 | 1592 | 50 | 0.30 |
| 76 | 29.6 | 1812 | 68 | 0.28 |
| 77 | 25.2 | 1848 | 64 | 0.28 |
| 78 | 23.6 | 1973 | 70 | 0.30 |
| 79 | 23.7 | 2078 | 66 | 0.36 |
| 80 | 35.6 | 1940 | 44 | 0.31 |
| 81 | 18.5 | 2339 | 33 | 0.29 |
| 82 | 30.2 | 2366 | 50 | 0.24 |
| 83 | 28.1 | 2425 | 40 | 0.29 |
| 84 | 29.6 | 2122 | 59 | 0.27 |
| 85 | 27.5 | 2193 | 56 | 0.16 |
| 86 | 21.1 | 2186 | 56 | 0.28 |
| 87 | 22.4 | 2061 | 56 | 0.27 |
| 88 | 31.3 | 2143 | 50 | 0.27 |
| 89 | 24.4 | 2108 | 54 | 0.26 |
| 90 | 39.9 | 2101 | 53 | 0.30 |
| 91 | 32.3 | 2551 | 55 | 0.25 |
| 92 | 24.3 | 2164 | 57 | 0.28 |
| 1$^{st}$ Quartile | 22.6 | 2045 | 53 | 0.27 |
| Median | 26.5 | 2164 | 60 | 0.28 |
| 3$^{rd}$ Quartile | 30.2 | 2291 | 70 | 0.30 |
| Mean | 26.6 | 2156 | 63 | 0.28 |

The Comminuted Meat

It is well known in the art to produce mechanically deboned or separated raw meats using high-pressure machinery that separates bone from animal tissue, by first crushing bone and adhering animal tissue and then forcing the animal tissue, and not the bone, through a sieve or similar screening device. The animal tissue in the present invention comprises muscle tissue, organ tissue, connective tissue and skin. The process forms an unstructured, paste-like blend of soft animal tissue with a batter-like consistency and is commonly referred to as mechanically deboned meat or MDM. This paste-like blend has a particle size of from about 0.25 to about 15 millimeters, preferably up to about 5 millimeters and most preferably up to about 3 millimeters.

Although the animal tissue, also known as raw meat, is preferably provided in at least substantially frozen form so as to avoid microbial spoilage prior to processing, once the meat is ground, it is not necessary to freeze it to provide cuttability into individual strips or pieces. Unlike meat meal, raw meat has a natural high moisture content of above about 50% and the protein is not denatured.

The raw meat used in the present invention may be any edible meat suitable for human consumption. The meat may be non-rendered, non-dried, raw meat, raw meat products, raw meat by-products, and mixtures thereof. The meat or meat products are comminuted and generally supplied daily in a completely frozen or at least substantially frozen condition so as to avoid microbial spoilage. Generally the temperature of the comminuted meat is below about 40° C. (104° F.), preferably below about 10° C. (50° F.) more preferably is from about −4° C. (25° F.) to about 6° C. (43° F.) and most preferably from about −2° C. (28° F.) to about 2° C. (36° F.). While refrigerated or chilled meat may be used, it is generally impractical to store large quantities of unfrozen meat for extended periods of time at a plant site. The frozen products provide a longer lay time than do the refrigerated or chilled products. Beef, pork, chicken, and turkey are preferred meat products intended for human consumption. Specific examples of animal food products which may be used in the process of the present invention include pork shoulder, beef shoulder, beef flank, turkey thigh, beef liver, ox heart, pigs heart, pork heads, pork skirt, beef mechanically deboned meat, pork mechanically deboned meat and chicken mechanically deboned meat. Mechanically deboned beef, mechanically deboned pork and mechanically deboned chicken are preferred.

In lieu of frozen comminuted meat, the comminuted meat may be freshly prepared for the preparation of the restructured meat product, as long as the freshly prepared comminuted meat meets the temperature conditions of not more than about 40° C. (104° F.).

The moisture content of the raw frozen or unfrozen meat is generally at least about 50% by weight, and most often from about 60% by weight to about 75% by weight, based upon the weight of the raw meat. In embodiments of the invention, the fat content of the raw frozen or unfrozen meat may be at least 2% by weight, generally from about 15% by weight to about 30% by weight. In other embodiments of the invention, meat products having a fat content of less than about 10% by weight and defatted meat products may be used.

The frozen or chilled meat may be stored at a temperature of about −18° C. (0.4° F.) to about 0° C. (32° F.). It is generally supplied in 20 kilogram blocks. Upon use, the blocks are permitted to thaw up to about 10° C. (50° F.), that is, to defrost, but in a tempered environment. Thus, the outer layer of the blocks, for example up to a depth of about ¼", may be defrosted or thawed but still at a temperature of about 0° C.

(32° F.), while the remaining inner portion of the blocks, while still frozen, are continuing to thaw and thus keeping the outer portion at below about 10° C. (50° F.).

The term "meat" is understood to apply not only to the flesh of cattle, swine, sheep and goats, but also horses, whales and other mammals, poultry and fish. The term "meat by-products" is intended to refer to those non-rendered parts of the carcass of slaughtered animals including but not restricted to mammals, poultry and the like and including such constituents as are embraced by the term "meat by-products" in the Definitions of Feed Ingredients published by the Association of American Feed Control Officials, Incorporated. The terms "meat," and "meat by-products," are understood to apply to all of those animal, poultry and marine products defined by said association.

Examples of meat which may be used are mammalian meat such as beef, veal, pork, and horsemeat, and the fleshy tissue from bison, cows, deer, elk, and the like. Poultry meat which may be used includes chicken, turkey, duck, or goose and the like. Embodiments of the invention may also utilize the flesh of fish and shell fish. Meat includes striated muscle which is skeletal or that which is found, for example, in the tongue, diaphragm, heart, or esophagus, with or without accompanying overlying fat and portions of the skin, sinew, nerve and blood vessels which normally accompany the meat flesh. Examples of meat by-products are organs and tissues such as lungs, spleens, kidneys, brain, liver, blood, bone, partially defatted low-temperature fatty tissues, stomachs, intestines free of their contents, and the like. Poultry by-products include non rendered clean parts of carcasses of slaughtered poultry such as heads, feet, and viscera, free from fecal content and foreign matter.

Water

Employed as water, is tap water, distilled water or deionized water. The purpose of the water is to hydrate the ingredients of soy protein, soy cotyledon fiber, wheat gluten and starch contained within the soy protein composition such that these ingredients absorb the water and that the soy cotyledon fibers contained within the soy protein composition become separated. Typically, the ratio of soy protein composition on a moisture free basis to the hydration water is from about 1:1.75 to about 1:10, preferably from about 1:2 to about 1:7 and most preferably from about 1:2.5 to about 1:5. More water for hydration is employed when a low moisture soy protein composition is utilized in the restructured meat product. Less water for hydration is employed when a high moisture soy protein composition is utilized in the restructured meat product. The temperature of the water may range from 0° C. (32° F.) up to about 30° C. (86° F.). Hydration time may be from about 30 minutes up to several hours, depending upon the moisture content of the soy protein composition, the amount of water utilized and the temperature of the water.

The restructured meat product is prepared by a process comprising the steps of:

combining a hydrated and shredded protein composition, preferably a hydrated and shredded soy protein composition; wherein about 75 weight % of the protein composition is comprised of at least about 15 weight % of fragments comprised of protein fibers at least about 4 centimeters long, protein strands at least about 3 centimeters long, and protein chunks at least about 2 centimeters long and wherein at least about 75 weight % of the protein composition has a shear strength of at least about 1400 grams with a comminuted meat, wherein the temperature of the comminuted meat is below about 40° C. (104° F.); and mixing the preferred hydrated and shredded soy protein composition and the comminuted meat to produce a homogeneous, fibrous and structured meat product having a moisture content of at least about 50%.

Prior to hydration of the preferred soy protein composition, the weight ratio of the soy protein composition on a moisture free basis to the comminuted meat on a moisture free basis is generally from about 1:0.25 to about 1:50, preferably from about 1:1 to about 1:40 and most preferably from about 1:2 to about 1:20. The hydrated soy protein composition, after shredding into a fibrous material, and the comminuted meat are combined in a mixing device and mixed to give a homogeneous restructured meat product.

The product and process of this invention are completed by combining the preferred hydrated and shredded soy protein composition, comminuted meat, and water as per the disclosed ratios of protein composition to comminuted meat and protein composition to water. The soy protein composition is first hydrated with water and then shredded to expose the fibers. When hydration is complete, the comminuted meat is added and the contents are mixed until a homogeneous mass of a restructured meat product is obtained. At this point, the homogeneous restructured meat product may be formed into strips, steaks, cutlets, patties, ground or generally cube-shaped for kabobs, either by hand or by machine. The homogeneous restructured meat product may also be stuffed into permeable or impermeable casings.

The restructured meat product may also further comprise at least one selected from the group consisting of a gelling protein, an animal fat, sodium chloride, sodium tripolyphosphate, sodium acid pyrophosphate, a colorant, a curing agent, an antioxidant, an antimicrobial agent, a flavorant, and mixtures thereof.

The gelling protein is selected from the group consisting of a soy protein flour, a soy protein isolate and a soy protein concentrate. These are the same soy proteins that are utilized in the preparation of the soy protein composition. The soy protein isolate useful as a gelling protein is a high viscosity and/or medium/high gelling isolated soy protein. The gelling protein provides a gelling matrix within the restructured meat product. Suitable sources of high viscosity and/or medium/high gelling isolated soy protein (i.e., unhydrolyzed) for use as the gelling protein includes SUPRO® 620, SUPRO® 500E, SUPRO® 630, and SUPRO® EX33 available from Solae LLC (St. Louis, Mo.); PROFAM 981 available from Archer Daniels Midland (Decatur, Ill.); and PROLISSE® soy protein isolate available from Cargill Soy Protein Solutions, Inc. (Minneapolis, Minn.). The gelling protein is present at from about 2% to about 10% by weight, on a moisture free basis.

Animal fats are triglycerides with a highly saturated character. Typically animal fats are solids or waxy in nature at room temperature. The purpose of animal fats is to function as a gelling agent in the restructured meat product in the uncooked state and as a flavoring aid in the cooked state. The animal fats are generally present at from about 1% to about 30% by weight, on a moisture free basis and preferably at from about 2% to about 10% by weight, on a moisture free basis.

The sodium chloride and sodium phosphates are salts that are mixed into the restructured meat product to extract/solubilize myofibriller protein in the comminuted meat. These salts, used singly or in combination, in addition to being flavor enhancers, also help to bind the comminuted meat within the restructured meat product. These salts are generally present at from about 0.1% to about 4.0% by weight, on a moisture free basis and at from about 0.1% to about 1.0% by weight, on a moisture free basis, respectively. Preferably these salts are present at from about 0.5% to about 2.0% by weight, on a moisture free basis and at from about 0.2% to about 0.5% by weight, on a moisture free basis, respectively.

Colorants provide eye appeal to the restructured meat product. Colorants provide a red color to the restructured meat product in the uncooked state, as well as a brown color in the cooked state. Examples of colorants are edible colorings such as caramel color, paprika, cinnamon and FD & C (Food, Drug and Cosmetic) Red No. 3 (A.K.A. Food Red 14 and Erythrosine BS), FD & C Yellow No. 5 (A.K.A. Food Yellow 4 and Tartrazine), FD & C Yellow No. 6 (A.K.A. Food Yellow 3 and Sunset Yellow FCF), FD & C Green No. 3 (A.K.A. Food Green 3 and Fast Green FCF), FD & C Blue No. 2 (A.K.A. Food Blue 1 and Indigo Carmine), FD & C Blue No. 1 (A.K.A. Food Blue 2 and Brilliant Blue FCF), and FD & C Violet No. 1 (A.K.A. Food Violet 2 and Violet B6), as well as sodium nitrite, the latter of which also functions as a curing agent. Preferred is caramel, which can come in various color ranges.

By caramel it is meant an amorphous, dark brown, deliquescent powder or a thick liquid having a bitter taste, a burnt sugar odor and a specific gravity of approximately 1.35. It is soluble in water and dilute alcohol. Caramel is prepared by the careful, controlled heat treatment of carbohydrate or saccharide materials such as dextrose, invert sugar, lactose, malt syrup, molasses, sucrose, starch hydrolysates and fractions thereof. Other materials which may be employed during heat treatment to assist caramelization include acids (e.g. acetic acid, citric acid, phosphoric acid, sulfuric acid and sulfurous acid); and salts (e.g. ammonium, sodium or potassium carbonates, bicarbonates, dibasic phosphates or mono-basic phosphates).

In one process of manufacturing caramel described in U.S. Pat. No. 3,733,405, a liquid sugar, either cane or corn, is pumped into a reactor vessel along with one or a combination of the reagents authorized by the U.S. Food and Drug Administration and the mixture is heated. Temperatures ranging from about 121° C. (250° F.) to about 260° C. (500° F.) are maintained and the product is held between about 15 and about 250 pounds per square inch pressure (psi) while the polymerization takes place. When processing is completed the product is discharged to a flash cooler which drops the temperature to about 65° C. (150° F.). It is then filtered, cooled and pumped to storage.

It is preferred that the colorant be present in the restructured meat product in the range of between about 0.1% to about 2%, preferably in the range of from about 0.2% to about 1% and most preferably in the range of from about 0.25% to about 0.75% by weight of the restructured meat product when a liquid is used.

Even though the restructured meat product is derived from a meat source, it is advantageous to add a flavorant to the restructured meat product to enhance its aroma and taste. The flavorants are natural or artificial. The flavorants are selected from the group consisting of beef flavor, pork flavor, and chicken flavor. A beef flavor is preferred. The flavorants are generally present at from about 0.1% to about 5.0% by weight, on a moisture free basis and preferably at from about 0.5% to about 3.0% by weight, on a moisture free basis.

When the restructured meat product further comprises at least one selected from the group consisting of a gelling protein, an animal fat, sodium chloride, sodium tripolyphosphate, a colorant, a curing agent, an antioxidant, an antimicrobial agent, a flavorant, or mixtures thereof, the product and process are completed in a procedure similar to the product and process utilizing only the vegetable protein composition, comminuted meat, and water. The vegetable protein composition is first hydrated with water and shredded to expose and separate the fibers. When hydration and shredding are complete, a colorant is added. The comminuted meat and water are added and the contents are mixed until a homogeneous mass is obtained. This is followed by the addition of an animal fat, a flavorant, sodium chloride, and sodium tripolyphosphate, and the gelling protein.

The homogeneous restructured meat product may be formed into strips, steaks, cutlets, patties, or generally cube-shaped for kabobs, either by hand or by machine. The homogeneous restructured meat product may be formed into meat sticks. The homogeneous restructured meat product may also be stuffed into permeable or impermeable casings to form sausages.

The restructured meat product, either with or without a gelling protein, may be dried, e.g. as a jerky, or partially dried, e.g. as a salami. Preferably the restructured meat product has a moisture content of at least about 50% before drying. If dried or partially dried, the restructured meat product has a moisture content of from about 15 to about 45%. An example of a dried meat product is a jerky product.

The restructured meat product once formed is either cooked, partially cooked for finishing at a later time or frozen either in an uncooked state, partially cooked state or cooked state. Cooking includes frying either as sautéing or as deep frying, baking, smoking and impingement. The fully cooked restructured meat product may be further sliced, shredded, or ground.

Further, the restructured meat product may be subjected to fermentation. Meat products are fermented by adjusting the pH of the meat product to between about 4.0 to about 5.2. Fermentation is accomplished by the addition of at least one selected from the group consisting of a lactic acid culture, citric acid, glucono delta lactone, and mixtures thereof.

Jerky products of the present invention may be produced in a variety of shapes such as bone shaped, chop shaped, round, triangular, chicken bone shaped, square, rectangular, strip shaped, and the like. The different shapes may be produced simultaneously by using variously shaped molds or cavities upon a single die roll. Furthermore, the pieces may be embossed or impressed with a logo or design contained in the cavities or molds of the die roll.

The jerky products of the present invention exhibit shelf stability under unrefrigerated conditions of at least about six months and preferably at least about twelve months in proper moisture proof packaging, such as foil-lined bags. Furthermore, the restructured meat product can also be made into shelf stable shredded meats and crumbles. They are typically made with spices and flavors and have a water activity of from about 0.65 up to about 0.8. They may be consumed as a high protein rice topping, as meat snacks, and as a substitute for Mexican "machaca."

The restructured meat product (before drying, partially dried, dried, cooked or uncooked) may be packaged as is. Further processing of the restructured meat product (before drying, partially dried, dried, cooked or uncooked) may be shock-frozen, for example in a freeze tunnel, and subsequent automatic portion packaging in containers of a suitable type, for example, plastic pouches or the like. Said type of further processing and packaging is suitable if the product is intended for fast-food outlets or for food service applications, where the product is usually deep-fried or baked before consumption.

Alternatively, after the formation of the restructured meat product (before drying, partially dried, dried, cooked or uncooked), it is also possible to spray the surface of the product with carbohydrate solutions or related substances in order to obtain uniform browning during deep frying or baking. Subsequently, the product can now be shock frozen and sold portion packed (i.e. in pouches). The restructured meat product can also be baked or processed in a convection oven by the consumer, instead of deep frying. Further, the restructured meat product also can be breaded prior to or after cooking, or coated with another type of coating. Additionally, the restructured meat product can be retort cooked in order to kill any microbes that might be present.

The restructured meat product either cooked or uncooked may also be packed and sealed in cans in a conventional manner and employing conventional sealing procedures. Normally, the cans at this stage are maintained at a temperature of between 65° C. and 77° C. and are carried to a retort or cooking stage as quickly as possible to prevent there being any risk of microbiological spoilage during the time between canning and sterilization during the retort or cooking stage.

In order to ensure that the restructured meat product, once formed, has the texture of intact muscles, it is necessary that at least about 75 weight % of the protein composition contains at least about 15 weight % of large pieces comprised of vegetable protein fibers at least about 4 centimeters long, vegetable protein strands at least about 3 centimeters long, and vegetable protein chunks at least about 2 centimeters long and that at least about 75 weight % of the protein composition has a shear strength of at least about 1400 grams.

A vegetable product is prepared by a process comprising the steps of:
combining
a hydrated and shredded protein composition, preferably a hydrated and shredded soy protein composition; wherein about 75 weight % of the protein composition is comprised of at least about 15 weight % of fragments comprised of protein fibers at least about 4 centimeters long, protein strands at least about 3 centimeters long, and protein chunks at least about 2 centimeters long and
wherein at least about 75 weight % of the protein composition has a shear strength of at least about 1400 grams; with
a comminuted vegetable; and
mixing the preferred hydrated and shredded soy protein composition and the comminuted vegetable to produce a homogeneous, fibrous and structured vegetable product.

Examples of vegetable products prepared by the above process are vegetarian food products including vegetarian patties, vegetarian hot dogs, vegetarian sausages, and vegetarian crumbles.

Another example of a vegetarian food product are cheeses that are extended with the hydrated and shredded protein composition.

A fruit product is prepared by a process comprising the steps of:
combining
a hydrated and shredded protein composition, preferably a hydrated and shredded soy protein composition; wherein about 75 weight % of the protein composition is comprised of at least about 15 weight % of fragments comprised of protein fibers at least about 4 centimeters long, protein strands at least about 3 centimeters long, and protein chunks at least about 2 centimeters long and
wherein at least about 75 weight % of the protein composition has a shear strength of at least about 1400 grams; with
a comminuted fruit; and
mixing the preferred hydrated and shredded soy protein composition and the comminuted fruit to produce a homogeneous, fibrous and structured fruit product.

Examples of fruit products prepared by the above process are snack food products including fruit rollups, cereals, and fruit crumbles.

The invention having been generally described above, may be better understood by reference to the examples described below. The following examples represent specific but non-limiting embodiments of the present invention.

Example 93

Added to a mixing vessel are 3625 grams of tap water at about 10° C. (50° F.) and while stirring 1160 grams of a dried, low moisture (about 7% to about 12%) soy protein composition, identified as FXP MO339, available from Solae, LLC, St. Louis, Mo. comprising a soy protein isolate, soy cotyledon fiber, wheat gluten and starch is added until the soy protein composition is hydrated and the fibers are separated. Added to the mixer are 5216 grams of a comminuted meat of mechanically deboned chicken having a moisture content of at least about 50%. The mechanically deboned chicken is at a temperature of from about 2° C. (36° F.) to about 4° C. (39° F.). The contents are mixed until a homogeneous restructured meat product is obtained. The restructured meat product is transferred to a Hollymatic forming machine where the restructured meat product is formed into steaks or cutlets which are then frozen.

Example 94

The procedure of Example 1 is repeated, except that 1500 grams of a non-dried low moisture (about 28-about 35%) soy protein composition comprising a soy protein isolate, soy cotyledon fiber, wheat gluten and starch is hydrated with 3175 grams water. The restructured meat product is transferred to a stuffing machine where the restructured meat product is stuffed into impermeable casings, which are then frozen. Stuffing machines are available from various commercial manufacturers including, but not limited to, HITEC Food Equipment, Inc., located in Elk Grove Village, Ill., Townsend Engineering Co., located in Des Moines, Iowa, Robert Reiser & Co., Inc., located in Canton, Mass., and Handtmann, Inc., located in Buffalo Grove, Ill.

Example 95

Added to a first mixing vessel are 2127 grams of tap water at about 12° C. (54° F.) and while stirring 1000 grams of a dried, low moisture (about 7% to about 12%) soy protein composition is added until the soy protein composition is hydrated and the fibers are separated. Caramel coloring, 43 grams, is then added to the hydrated soy protein composition. At about 2° C. (36° F.), 4500 grams of a comminuted meat of mechanically deboned chicken having a moisture content of about 50% is added. Then added are 100 grams sodium chloride and 30 grams of sodium tripolyphosphate to extract/solubilize myofibriller protein in the comminuted meat for binding. As mixing is continued, 500 grams beef fat and 100 grams beef flavor are added and mixing is continued. In a second mixing vessel, a gelling protein of 600 grams of Supro® 620 is hydrated in 1000 grams water and is added to the first mixing vessel. The contents are mixed until a homogeneous restructured meat product is obtained. The restructured meat product is transferred to a Hollymatic (Hollymatic Corp., Park Forest Ill.) forming machine where the restructured meat product is formed into patties, which are then frozen.

Example 96

Added to a mixing vessel are 3000 grams of tap water at about 10° C. (50° F.) and while stirring 1500 grams of a soy protein extrudate prepared from Supro® 620 is added until the soy protein composition is hydrated and the fibers are separated by shredding. Added to the mixer are 5000 grams of a comminuted meat of mechanically deboned chicken having a moisture content of about 50%. The mechanically deboned chicken is at a temperature of from about 2° C. (36° F.) to about 4° C. (39° F.). The contents are mixed until a homogeneous restructured meat product is obtained. The restructured meat product is transferred to a Hollymatic forming machine where the restructured meat product is formed into steaks or cutlets which are then frozen.

Example 97

The procedure of Example 96 is repeated except that the hydrated and shredded soy protein composition comprises a soy protein isolate, rice flour, and a gluten free starch.

Example 98

The procedure of Example 96 is repeated except that the hydrated and shredded soy protein composition comprises a soy protein isolate and rice flour.

Example 99

The procedure of Example 96 is repeated except that the hydrated and shredded soy protein composition comprises a soy protein isolate and a gluten free starch.

Example 100

The procedure of Example 96 is repeated except that the hydrated and shredded soy protein composition comprises a soy protein isolate, wheat flour and starch.

Example 101

The procedure of Example 96 is repeated except that the hydrated and shredded soy protein composition comprises a soy protein isolate and soy cotyledon fiber.

Example 102

The procedure of Example 96 is repeated except that the hydrated and shredded soy protein composition comprises a soy protein isolate, soy cotyledon fiber, and wheat gluten.

Example 103

Added to a mixing vessel are 3383 grams of tap water at about 10° C. (50° F.) and while stirring 1208 grams of a dried, low moisture (about 7% to about 12%) soy protein extrudate, identified as FXP MO339, is added until the soy protein extrudate is hydrated and the fibers are separated by shredding. Added to the mixer are 3340 grams of a comminuted meat of mechanically deboned chicken having a moisture content of at least about 50% and 3383 grams of beef of a ½ inch grind having a fat content of about 10%. The mechanically deboned chicken and the beef grind are at a temperature of from about 2° C. (36° F.) to about 4° C. (39° F.). Also added are various colorants and flavorants of salt, erythorbate, sodium nitrite, dextrose, cracked black pepper, nutmeg, mace, granulated garlic, coriander, red pepper, and a rehydrated LHP starter culture. The contents are mixed until a homogeneous restructured meat product is obtained. The restructured meat product is then formed into meat sticks.

Example 104

While the invention has been explained in relation to its preferred embodiments, it is to be understood that various modifications thereof will become apparent to those skilled in the art upon reading the description. Therefore, it is to be understood that the invention disclosed herein is intended to cover such modifications as fall within the scope of the appended claims.

What is claimed is:

1. A hydrated and shredded protein composition, wherein about 75 weight % of the protein composition is comprised of at least about 15 weight % of fragments comprised of protein fibers at least about 4 centimeters long, protein strands at least about 3 centimeters long, and protein chunks at least about 2 centimeters long, which fibers, strands, and chunks are formed by extrusion of a protein material, and wherein at least about 75 weight % of the protein composition has a shear strength of at least about 1400 grams.

2. The hydrated and shredded protein composition of claim 1 wherein the protein is selected from the group consisting of vegetable proteins, dairy proteins, and mixtures thereof.

3. The hydrated and shredded protein composition of claim 2 wherein the protein further comprises wheat gluten.

4. The hydrated and shredded protein composition of claim 2 wherein the vegetable protein is selected from the group consisting of protein derived from legumes, soybeans, corn, peas, canola seeds, sunflower seeds, rice, amaranth, lupin, rape seeds, and mixtures thereof.

5. The hydrated and shredded protein composition of claim 2 wherein the protein further comprises wheat protein, wheat gluten, and mixtures thereof.

6. The hydrated and shredded protein composition of claim 2 wherein the vegetable protein is a soybean protein.

7. The hydrated and shredded protein composition of claim 6 wherein the soybean protein is selected from the group consisting of a soy protein isolate, a soy protein concentrate, a soy protein flour, and mixtures thereof.

8. The hydrated and shredded protein composition of claim 7 wherein the soybean protein is a soy protein isolate.

9. The hydrated and shredded protein composition of claim 7 further comprising a component selected from the group consisting of a starch, gluten free starch, rice flour, wheat flour, wheat gluten, soy cotyledon fiber, and mixtures thereof.

10. The hydrated and shredded protein composition of claim 7 further comprising from about 1% to about 20% by weight on a moisture free basis of a soy cotyledon fiber.

11. The hydrated and shredded protein composition of claim 10 further comprising from about 10% to about 40% wheat gluten, by weight on a moisture free basis.

12. The hydrated and shredded protein composition of claim 11 further comprising from about 5% to about 15% starch, by weight on a moisture free basis.

13. The hydrated and shredded protein composition of claim 12 comprising from about 30% to about 90% soy protein, by weight on a moisture free basis.

14. The hydrated and shredded protein composition of claim 1 wherein the protein composition has a moisture content of from about 5% to about 80%.

15. A restructured meat product, comprising;
a hydrated and shredded protein composition;
a comminuted meat; and
water;
wherein at least about 75 weight % of the hydrated and shredded protein composition is comprised of at least about 15 weight % of fragments comprised of protein fibers at least about 4 centimeters long, protein strands at least about 3 centimeters long, and protein chunks at least about 2 centimeters long, which fibers, strands, and chunks are formed by extrusion of a protein material, and wherein at least about 75 weight % of the protein composition has a shear strength of at least about 1400 grams.

16. The restructured meat product of claim 15 wherein the hydrated and shredded protein is selected from the group consisting of vegetable proteins, dairy proteins, and mixtures thereof.

17. The restructured meat product of claim 16 wherein the hydrated and shredded protein further comprises wheat gluten.

18. The restructured meat product of claim 16 wherein the hydrated and shredded protein is selected from the group consisting of protein derived from legumes, soybeans, corn, peas, canola seeds, sunflower seeds, rice, amaranth, lupin, rape seeds, and mixtures thereof.

19. The restructured meat product of claim 16 wherein the hydrated and shredded protein further comprises wheat protein, wheat gluten, and mixtures thereof.

20. The restructured meat product of claim 18 wherein the hydrated and shredded protein is a soybean protein.

21. The restructured meat product of claim 20 wherein the soybean protein is selected from the group consisting of a soy protein isolate, a soy protein concentrate, a soy protein flour, and mixtures thereof.

22. The restructured meat product of claim 21 wherein the soybean protein is a soy protein isolate.

23. The restructured meat product of claim 21 further comprising a component selected from the group consisting of a starch, gluten free starch, rice flour, wheat flour, wheat gluten, soy cotyledon fiber, and mixtures thereof.

24. The restructured meat product of claim 21 further comprising in the soy protein composition from about 1% to about 20% by weight on a moisture free basis of a soy cotyledon fiber.

25. The restructured meat product of claim 24 further comprising in the soy protein composition from about 10% to about 40% wheat gluten, by weight on a moisture free basis.

26. The restructured meat product of claim 25 further comprising in the soy protein composition from about 5% to about 15% starch, by weight on a moisture free basis.

27. The restructured meat product of claim 26 comprising in the hydrated and shredded protein composition from about 30% to about 90% soy protein, by weight on a moisture free basis.

28. The restructured meat product of claim 15 wherein the hydrated and shredded protein composition has a moisture content of from about 5% to about 80%.

29. The restructured meat product of claim 15 wherein the comminuted meat has a moisture content of at least about 50% by weight.

30. The restructured meat product of claim 15 further comprising at least one selected from the group consisting of a gelling protein, an animal fat, sodium chloride, sodium tripolyphosphate, a colorant, a curing agent, an antioxidant, an antimicrobial agent, a flavorant, and mixtures thereof.

31. The restructured meat product of claim 30 wherein the gelling protein is selected from the group consisting of a soy protein isolate, a soy protein concentrate, a soy protein flour, and mixtures thereof.

32. The restructured meat product of claim 15 wherein the restructured meat product has a moisture content, before drying, of at least about 50% and after drying, has a moisture content of from about 15 to about 45%.

33. The restructured meat product of claim 15 wherein the weight ratio of the protein composition on a moisture free basis to the comminuted meat on a moisture free basis is from about 1:0.25 to about 1:50.

34. The restructured meat product of claim 15 formed into strips, steaks, cutlets, patties, ground or generally cube-shaped for kabobs.

35. The restructured meat product of claim 15 stuffed into permeable or impermeable casings.

36. The restructured meat product of claim 15 fermented by the addition of at least one selected from the group consisting of a lactic acid culture, glucono delta lactone, citric acid, and mixtures thereof.

37. A vegetable product, comprising;
a hydrated and shredded protein composition;
a comminuted vegetable; and
water;
wherein at least about 75 weight % of the hydrated and shredded protein composition is comprised of at least about 15 weight % of fragments comprised of protein fibers at least about 4 centimeters long, protein strands at least about 3 centimeters long, and protein chunks at least about 2 centimeters long, which fibers, strands, and chunks are formed by extrusion of a protein material, and wherein at least about 75 weight % of the protein composition has a shear strength of at least about 1400 grams.

38. A fruit product, comprising;
a hydrated and shredded protein composition;
a comminuted fruit; and
water;
wherein at least about 75 weight % of the hydrated and shredded protein composition is comprised of at least about 15 weight % of fragments comprised of protein fibers at least about 4 centimeters long, protein strands at least about 3 centimeters long, and protein chunks at least about 2 centimeters long, which fibers, strands, and chunks are formed by extrusion of a protein material, and wherein at least about 75 weight % of the protein composition has a shear strength of at least about 1400 grams.

* * * * *